(12) United States Patent
Fukatsu et al.

(10) Patent No.: US 8,530,781 B2
(45) Date of Patent: Sep. 10, 2013

(54) PROCESSING APPARATUS

(75) Inventors: Kenta Fukatsu, Fujisawa (JP); Tsubasa Kusaka, Yokohama (JP); Daisuke Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 504 days.

(21) Appl. No.: 12/633,154

(22) Filed: Dec. 8, 2009

(65) Prior Publication Data

US 2010/0140229 A1    Jun. 10, 2010

(30) Foreign Application Priority Data

Dec. 9, 2008    (JP) ................. 2008-313583

(51) Int. Cl.
*H01S 3/00*    (2006.01)

(52) U.S. Cl.
USPC ............ 219/121.6; 219/121.68; 219/121.69; 219/121.71; 219/121.73; 219/121.75; 219/121.77

(58) Field of Classification Search
USPC ............... 219/121.6, 121.61, 121.62, 121.68, 219/121.69, 121.7, 121.71, 121.73, 121.74, 219/121.75, 121.77, 121.82, 68, 69, 71, 73, 219/75, 77
See application file for complete search history.

(56) References Cited

U.S. PATENT DOCUMENTS

| | | | | |
|---|---|---|---|---|
| 6,040,552 | A * | 3/2000 | Jain et al. | 219/121.7 |
| 6,747,244 | B1 * | 6/2004 | Koide | 219/121.71 |
| 2004/0017429 | A1 * | 1/2004 | Liu et al. | 347/47 |
| 2004/0251243 | A1 * | 12/2004 | Lizotte et al. | 219/121.73 |
| 2006/0000816 | A1 * | 1/2006 | Hogan | 219/121.75 |

FOREIGN PATENT DOCUMENTS

| | | |
|---|---|---|
| JP | 8-36144 | 2/1996 |
| JP | 11-507877 | 7/1999 |
| JP | 11-248489 | 9/1999 |
| JP | 2001-62582 | 3/2001 |
| JP | 2001-241934 | 9/2001 |
| JP | 2002-118050 | 4/2002 |
| JP | 2006-15402 | 1/2006 |
| JP | 2006-26699 | 2/2006 |
| JP | 2006-263763 | 10/2006 |
| WO | WO 2008/038385 A1 | 4/2008 |

OTHER PUBLICATIONS

Office Action issued Feb. 8, 2011, in Japan Patent Application No. 2008-313583 (with English translation).

\* cited by examiner

*Primary Examiner* — Minhloan T Tran
*Assistant Examiner* — Fazli Erdem
(74) *Attorney, Agent, or Firm* — Oblon, Spivak, McClelland, Maier & Neustadt, L.L.P.

(57) ABSTRACT

An processing apparatus comprises a laser oscillator, an overall control device which controls an operation of the laser oscillator, and a plurality of processing units. The processing unit comprises a holding part which movably holds a processed object, an optical system which guides the laser beam, oscillated from the laser oscillator, toward the processed object, a shutter which selectively prevents the laser beam from reaching the processed object, and an individual control device which controls an operation of the holding part, and transmits a laser request signal to the overall control device. When at least one of the plurality of individual control devices transmits the request signal, the overall control device controls the shutter of the processing unit, which has transmitted the laser request signal, to enable the laser beam to reach the processed object, and drives the laser oscillator to allow the laser oscillator to oscillate the laser beam.

11 Claims, 13 Drawing Sheets

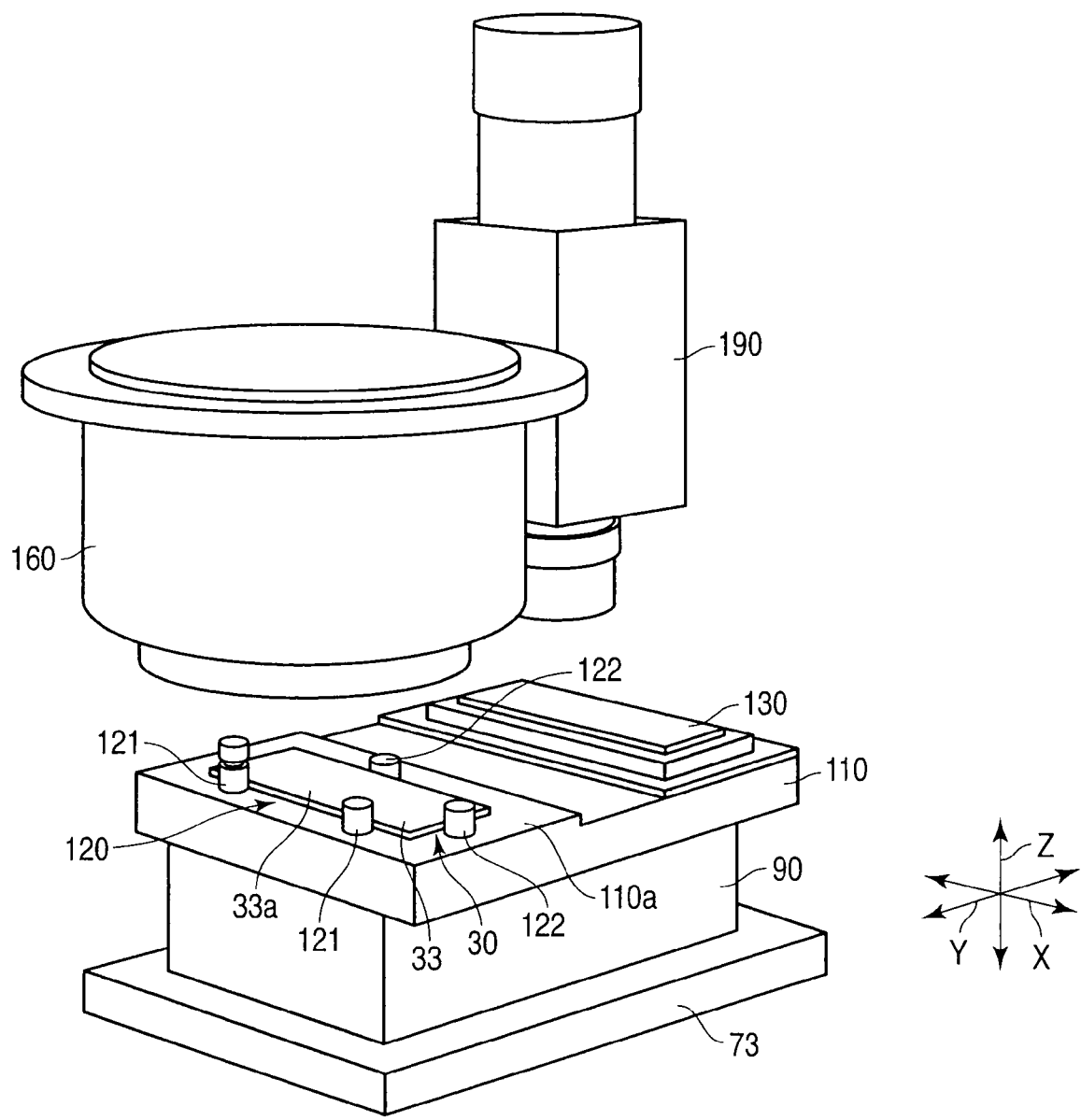
F I G. 4

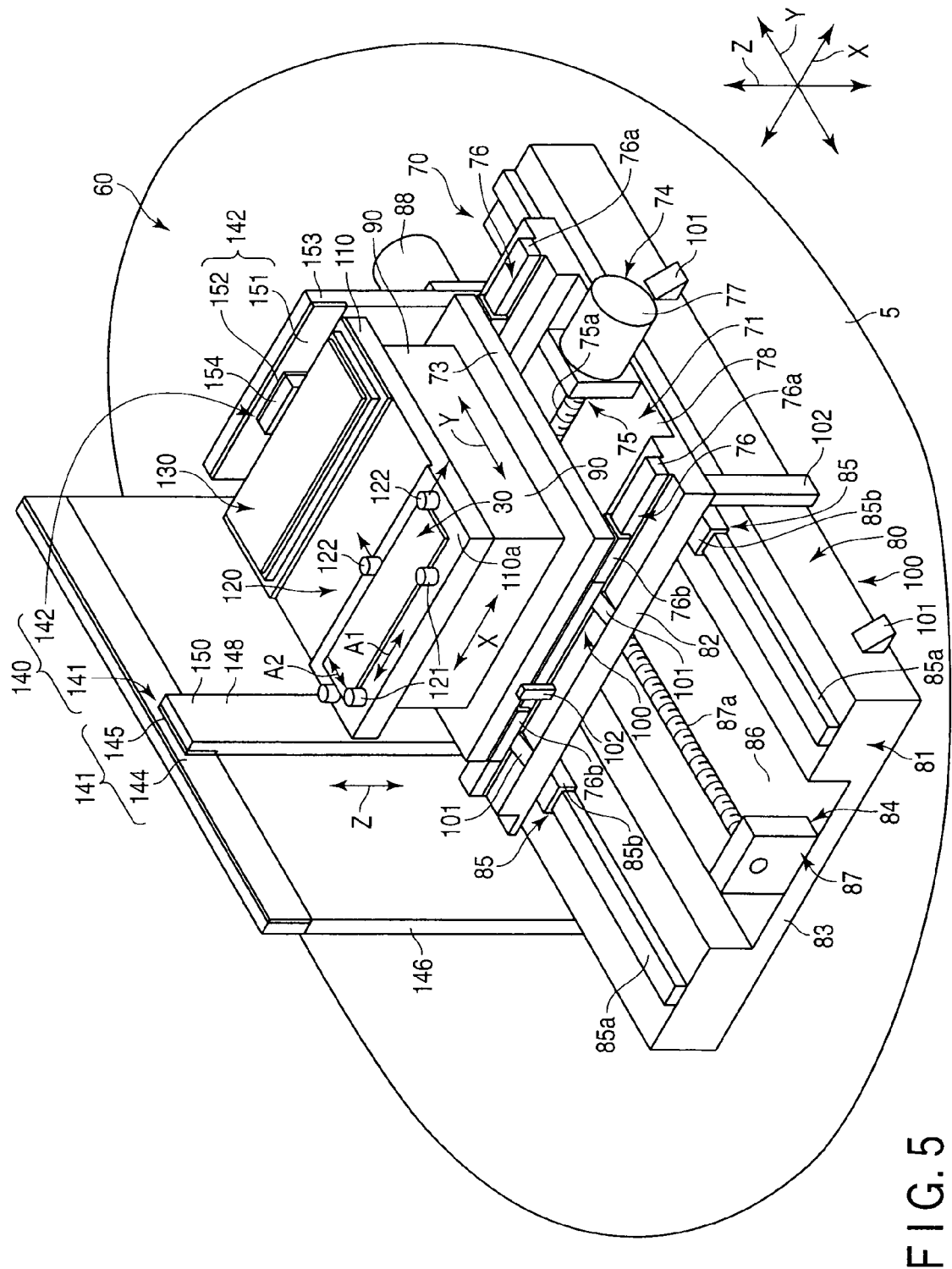
F I G. 5

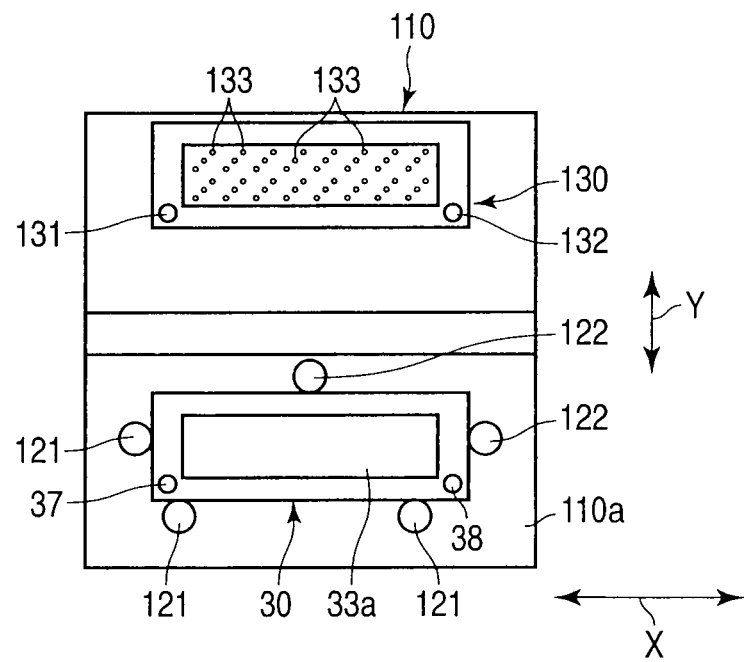
F I G. 9
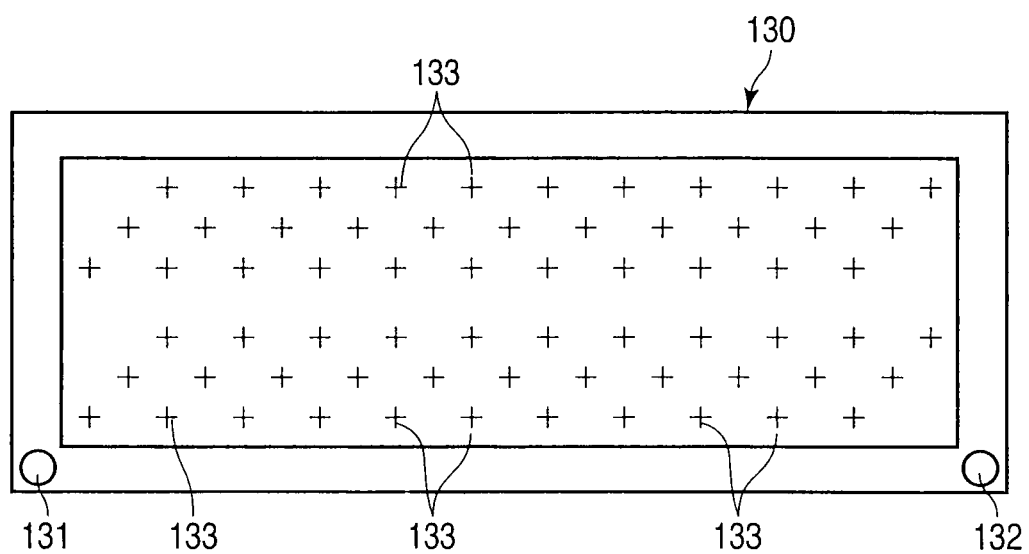
F I G. 10

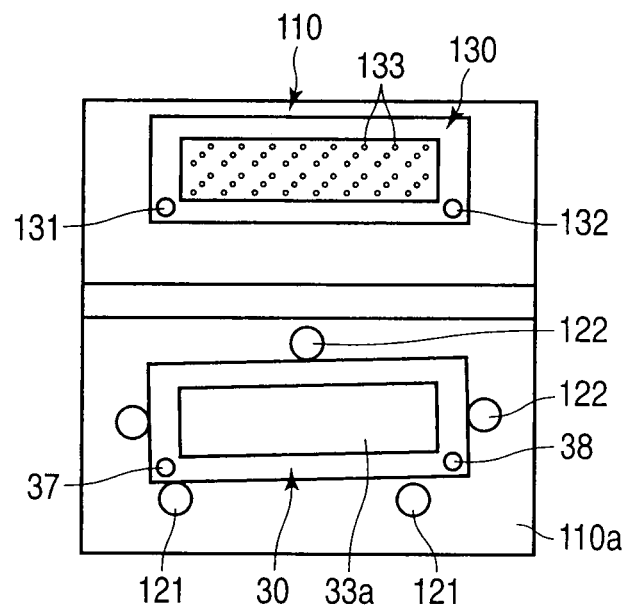
F I G. 16
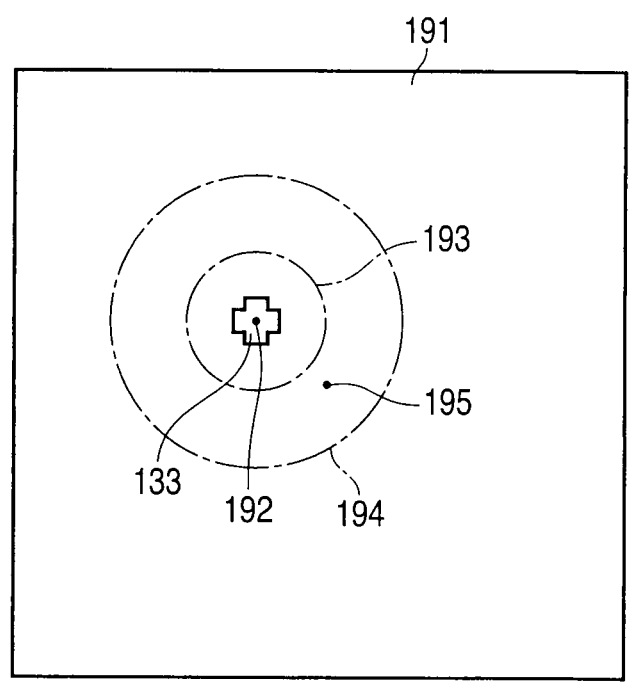
F I G. 17

PROCESSING APPARATUS

CROSS-REFERENCE TO RELATED APPLICATIONS

This application is based upon and claims the benefit of priority from prior Japanese Patent Application No. 2008-313583, filed Dec. 9, 2008, the entire contents of which are incorporated herein by reference.

BACKGROUND OF THE INVENTION

1. Field of the Invention

The present invention relates to a processing apparatus which processes a processed object using a laser beam.

2. Description of the Related Art

A piezoelectric head is used as a head of an inkjet printer. The piezoelectric head has, for example, such a structure that a plate-like piezoelectric element with a plurality of grooves for storing ink is provided on a substrate such as ceramic.

The groove is opened in one end surface of the piezoelectric element on the opposite side of the substrate. Thus, a polyimide film covering the groove is provided on the surface of the piezoelectric element on the opposite side of the substrate. The polyimide film comprises a nozzle formed at a portion facing the groove and jetting ink.

For example, an electrode is attached to a bulkhead which partitions the groove in the piezoelectric element. The bulkhead is deformed by being subjected to a voltage through the electrode, and therefore, the ink stored in the groove passes through the nozzle, provided in the polyimide film, to be pushed out.

In the printer head formed as above, the nozzle to be provided in the polyimide film is processed and formed by a processing apparatus in such a state that the polyimide film is fixed to the piezoelectric element. For this type of processing apparatus, there is proposed a processing apparatus which forms the nozzle in the polyimide film using a laser beam.

This type of processing apparatus comprises an X, Y stage movable in two directions perpendicular to each other and a holding table provided on the X, Y stage and movable in the direction perpendicular to the two directions. The holding table comprises a processing stage onto which a processed object such as a printer head is fixed.

One X, Y stage has one processing head, and a laser beam is applied to a processed object, such as a printer head, through the processing head. The processed object is processed by the laser beam. This type of technique is disclosed in Jpn. Pat. Appln. KOKAI Publication No. 2001-241934.

In the processing apparatus disclosed in the Jpn. Pat. Appln. KOKAI Publication No. 2001-241934, a laser beam can be applied to one point of a processed object by one laser beam application from a laser oscillator. In other words, one point of the processed object can be processed by one laser beam application from the laser oscillator.

However, the polyimide film of the printer head should comprise a plurality of nozzles, and therefore, if only one point can be processed by one laser beam application from the laser oscillator, the production efficiency of the printer head is deteriorated.

Meanwhile, a mask having a plurality of laser transparent windows and a stepper lens are interposed between a processing head and a processed object, whereby a laser beam is applied to a plurality of points of the processed object by one laser beam emission from a laser oscillator. The laser beam is divided into a plurality of groups by the mask and the stepper lens to be applied to a plurality of points of the processed object.

However, in the above constitution, the mask is required to be formed according to the processing of the processed object, and consequently the processing apparatus has a constitution specific to the processing of one kind of a processed object. Therefore, when the processing apparatus is configured to comprise the mask having a plurality of laser transparent windows and the stepper lens, the flexibility for forming other kinds of processed objects tends to be reduced.

BRIEF SUMMARY OF THE INVENTION

Thus, an object of the present invention is to provide a processing apparatus which can enhance productivity and flexibility of processing.

According to an aspect of the present invention, a processing apparatus comprises; a laser oscillator which oscillates a laser beam; an overall control device which controls an operation of the laser oscillator; and a plurality of processing units comprising a holding part which movably holds a processed object, an optical system which guides the laser beam, oscillated from the laser oscillator, toward the processed object, a shutter which selectively prevents the laser beam from reaching the processed object, and an individual control device which controls an operation of the holding part, and transmits a laser request signal to the overall control device. When at least one of said plurality of individual control devices transmits the laser request signal, the overall control device controls the shutter of the processing unit, which has transmitted the laser request signal, to enable the laser beam to reach the processed object, and drives the laser oscillator to allow the laser oscillator to oscillate the laser beam.

According to a preferred aspect of the present invention, the optical system comprises a mirror which reflects the laser beam, oscillated from the laser oscillator, toward the processed object. The mirrors of the processing units are arranged with a fixed distance in an advancing direction of the laser beam. The mirrors from the mirror, at which the laser beam first reaches in the advancing direction of the laser beam, to the mirror disposed next to the last one have characteristics reflecting a portion of the laser beam and allowing the remaining laser beam to transmit therethrough, and the mirror at which the laser beam last reaches in the advancing direction of the laser beam reflects all the laser beams having reached the mirror.

According to a preferred aspect of the present invention, the mirror of said each processing unit is adjusted so that intensities of the laser beams reaching the processed objects are the same.

According to a preferred aspect of the present invention, the holding part comprises a processing stage onto which the processed object is fixed. The processing unit comprises a position measuring instrument which measures a position of the processing stage. The position measuring instrument is fixed to a portion in the holding part, which moves along with the processing stage, and disposed on the processing stage or on an extension surface of the processing stage.

According to a preferred aspect of the present invention, the holding part is configured to move the processed object in a plurality of directions perpendicular to each other. The position measuring instrument is configured to detect a position along one direction, and at least one or more position measuring instruments are provided so that positions along at least one or more of said plurality of directions are detected.

According to a preferred aspect of the present invention, the position measuring instrument is fixed to the holding part through a supporting part. A value of a natural frequency of the supporting part is different from a value of a natural frequency of a portion on which the holding part is placed and a value of a natural frequency of the holding part.

According to a preferred aspect of the present invention, the holding part comprises a processing stage which is movable along a first direction and a second direction perpendicular to each other and onto which the processed object is fixed. The processing unit comprises a first position measuring instrument which measures a position in the first direction of the processing stage and a second position measuring instrument which measures a position in the second direction of the processing stage. The first position measuring instrument is supported by a portion in the holding part which is movable in the first direction, and is disposed at the same position as the processed object in a third direction at right angles to the first and second directions. The second position measuring instrument is supported by a portion of the holding part which is movable in the second direction, and is disposed at the same position as the processed object in the third direction.

According to a preferred aspect of the present invention, the first position measuring instrument is fixed by the holding part through a first supporting part. The second position measuring instrument is fixed by the holding part through a second supporting part. A natural frequency of the first and second holding parts has a different value from a natural frequency of the portion on which the holding part is placed and a natural frequency of the holding part.

According to a preferred aspect of the present invention, the processing unit comprises a reference gauge with a processing point mark and a photographing part which photographs the reference gauge. A relative positional relationship in a plan view, as viewed from a photographing direction of the photographing part, between a recognition position, set within a photographing range of the photographing part, and the processing point mark is the same as a relative positional relationship in the plan view, as viewed from an application direction of the laser beam, between a working point which is set in the processed object and at which the laser beam should reach and a position at which the laser beam reaches.

According to a preferred aspect of the present invention, an image taken by the photographing part is transmitted to the individual control device. When the processing point mark in an image taken by the photographing part is deviated from the recognition position, the individual control device detects the positional deviation after every movement of the holding part, and when the positional deviation exceeds an allowable error range, the individual control device controls the holding part so that the processing point mark is disposed within the allowable error range.

According to a preferred aspect of the present invention, the individual control device stores the deviation from the recognition position detected after every movement of the holding part, and previously incorporates a correction value into a moving amount in the movement of the holding part to the same position, the correction value being an average amount of a predetermined number of times of the positional deviation detected in the movement of the holding part to the same position.

The processing apparatus can enhance productivity and flexibility of processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a perspective view of the vicinity of a holding part in a processing unit shown in FIG. 1;

FIG. 5 is a perspective view of the holding part shown in FIG. 4;

FIG. 9 is a plan view of a processing stage shown in FIG. 5;

FIG. 10 is an enlarged plan view of a reference gauge shown in FIG. 9;

FIG. 16 is a plan view of the processing stage shown in FIG. 5, in which a printer head is fixed, causing positional deviation;

FIG. 17 is a view of an image taken by the camera after correction;

DETAILED DESCRIPTION OF THE INVENTION

Figure 1:
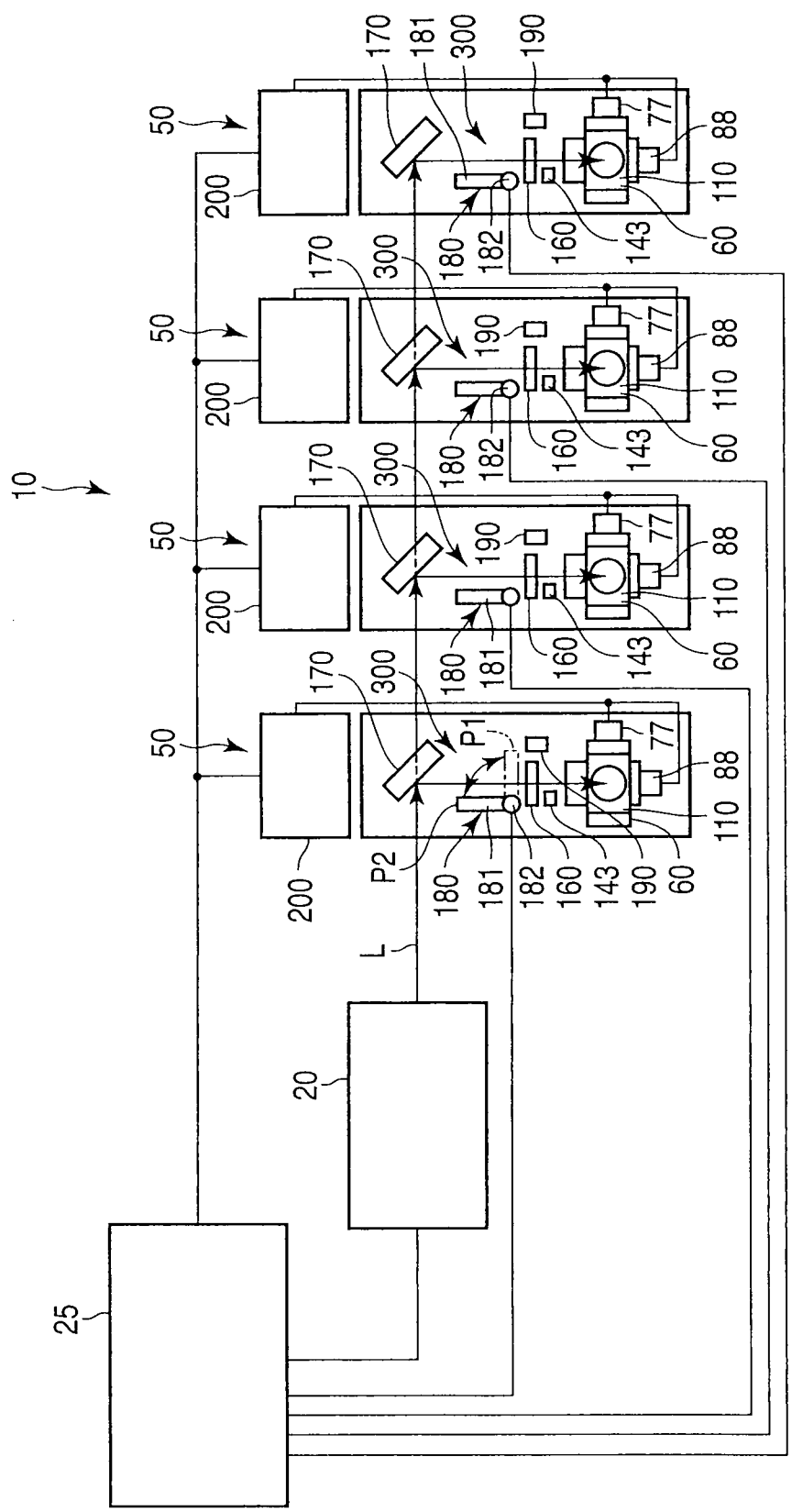
FIG. 1 is a schematic view of a processing apparatus according to an embodiment of the present invention.

A processing apparatus according to one embodiment of the present invention will be described using FIGS. 1 to 20. FIG. 1 is a schematic view of a processing apparatus 10 of the present embodiment. As shown in FIG. 1, the processing apparatus 10 comprises a laser oscillator 20. The processing apparatus 10 processes a processed object using a laser beam oscillated from the laser oscillator 20.

In the present embodiment, a printer head 30 for use in an inkjet printer is processed as an example of the processed object. Specifically, the processing apparatus 10 forms a nozzle jetting ink in the printer head 30.

Figure 2:
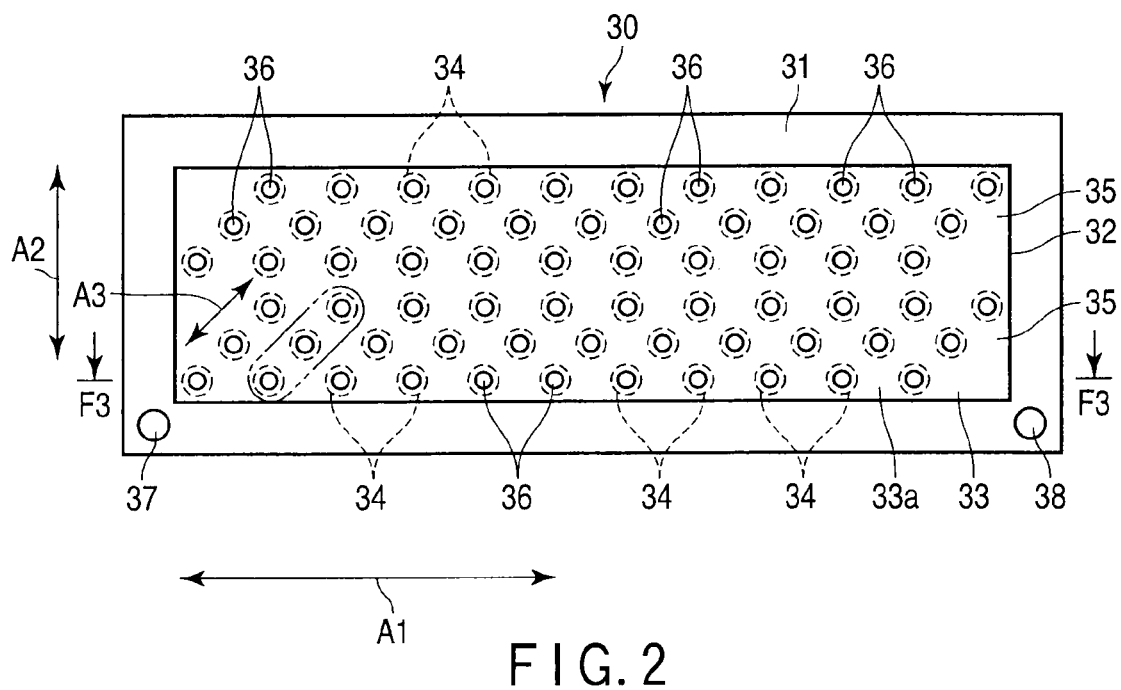
FIG. 2 is a plan view of a printer head after processed by the processing apparatus shown in FIG. 1.
Figure 3:
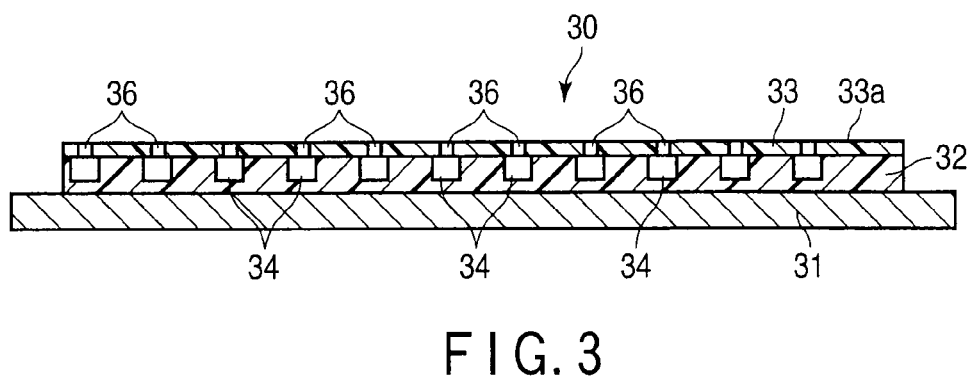
FIG. 3 is a cross-sectional view of the printer head shown along line F3-F3 shown in FIG. 2.

FIG. 2 shows the printer head 30 after processed by the processing apparatus 10. FIG. 2 is an overhead plan view of the printer head 30. FIG. 3 is a cross-sectional view of the printer head 30 shown along line F3-F3 shown in FIG. 2.

As shown in FIGS. 2 and 3, the printer head 30 comprises a substrate 31, a piezoelectric element 32, and a polyimide film 33.

The substrate 31 has a plate shape, for example, and is formed of ceramic. The piezoelectric element 32 has a plate shape and is fixed at the substantially center on one end surface of the substrate 31. The polyimide film 33 is fixed onto the surface of the piezoelectric element 32 on the opposite side of the surface in contact with the substrate 31. In FIG. 2, the printer head 30 is viewed from the side of the polyimide film 33. As shown in FIG. 2, the piezoelectric element 32 and the polyimide film 33 have substantially the same planar shape.

As shown in FIG. 3, the piezoelectric element 32 comprises a plurality of ink storage portions 34 for storing ink. Each of the ink storage portions 34 has a concave shape and opens in the surface on which the polyimide film 33 is placed. In FIG. 2, the edges of the ink storage portions 34 are shown by dashed lines.

The arrangement of the ink storage portions 34 is specifically described. As shown in FIG. 2, a longitudinal direction A1 and a crossing direction A2 are set in the printer head 30. The substrate 31 has a rectangular planar shape. The longitudinal direction A1 is a longitudinal direction. The crossing direction A2 is perpendicular to the longitudinal direction A1.

Three of the ink storage portions 34 make a set in an oblique direction A3 oblique to the longitudinal direction A1 and the crossing direction A2. A plurality of sets of the three ink storage portions 34 are arranged in parallel with the longitudinal direction A1 to constitute lines 35. The direction A3 is shown by the arrow. The lines 35 are provided as a pair in the crossing direction A2. In FIG. 2, as an example, one set of the ink storage portions 34 is surrounded by a two-dot chain line.

FIG. 3 is a cross-sectional view passing through the ink storage portions 34. As shown in FIG. 3, each of the ink storage portions 34 opens in the surface of the piezoelectric element 32 on which the polyimide film 33 is placed. The ink storage portions 34 are covered by the polyimide film 33.

As shown in FIGS. 2 and 3, nozzles 36 each having a hole shape and jetting ink are formed in the polyimide film 33 so as to face the ink storage portions 34. The nozzles 36 penetrate through the polyimide film 33. One nozzle 36 is formed for one ink storage portion 34. The processing apparatus 10 processes and forms the nozzle 36 with the laser beam oscillated from the laser oscillator 20.

As shown in FIG. 2, the substrate 31 comprises on its peripheral edge a first reference mark 37 for a substrate and a second reference mark 38 for a substrate. A line connecting the first and second reference marks 37 and 38 is parallel with the longitudinal direction A1, and, at the same time, the first and second reference marks 37 and 38 are arranged at the both ends in the longitudinal direction A1 of the substrate 31 so as to be separated from each other.

The description is returned to the description of the processing apparatus 10. As shown in FIG. 1, the processing apparatus 10 comprises one laser oscillator 20, a plurality of processing units 50, and one overall control device 25. The laser oscillator 20 oscillates a laser beam. The overall control device 25 controls the operation of the laser oscillator 20. The overall control device 25 will be described in detail later.

In the present embodiment, one processing unit 50 processes one printer head 30. In the present embodiment, four processing units 50 are used as an example. Therefore, the processing apparatus 10 can simultaneously process the four printer heads 30. Each of the processing units 50 may have substantially the same structure. The number of the processing units 50 is not limited to four, but plural, such as five or six, processing units 50 may be used.

The processing unit 50 comprises a holding part 60, a position detecting part 140, a machining lens 160, a camera 190, a mirror 170, a shutter 180, and an individual control device 200. The holding part 60 movably holds the printer head 30 so that the laser beam, oscillated from the laser oscillator 20, is applied to the printer head 30.

The laser oscillator 20 is fixed, for example, and thus the position of the laser beam L reaching the holding part 60 is fixed. Meanwhile, the holding part 60 moves the printer head 30 so that the laser beam L is applied to the working point of the printer head 30. The printer head 30 is moved with respect to the fixed arrival position of the laser beam L, whereby the relative position therebetween is changed.

Figure 6:
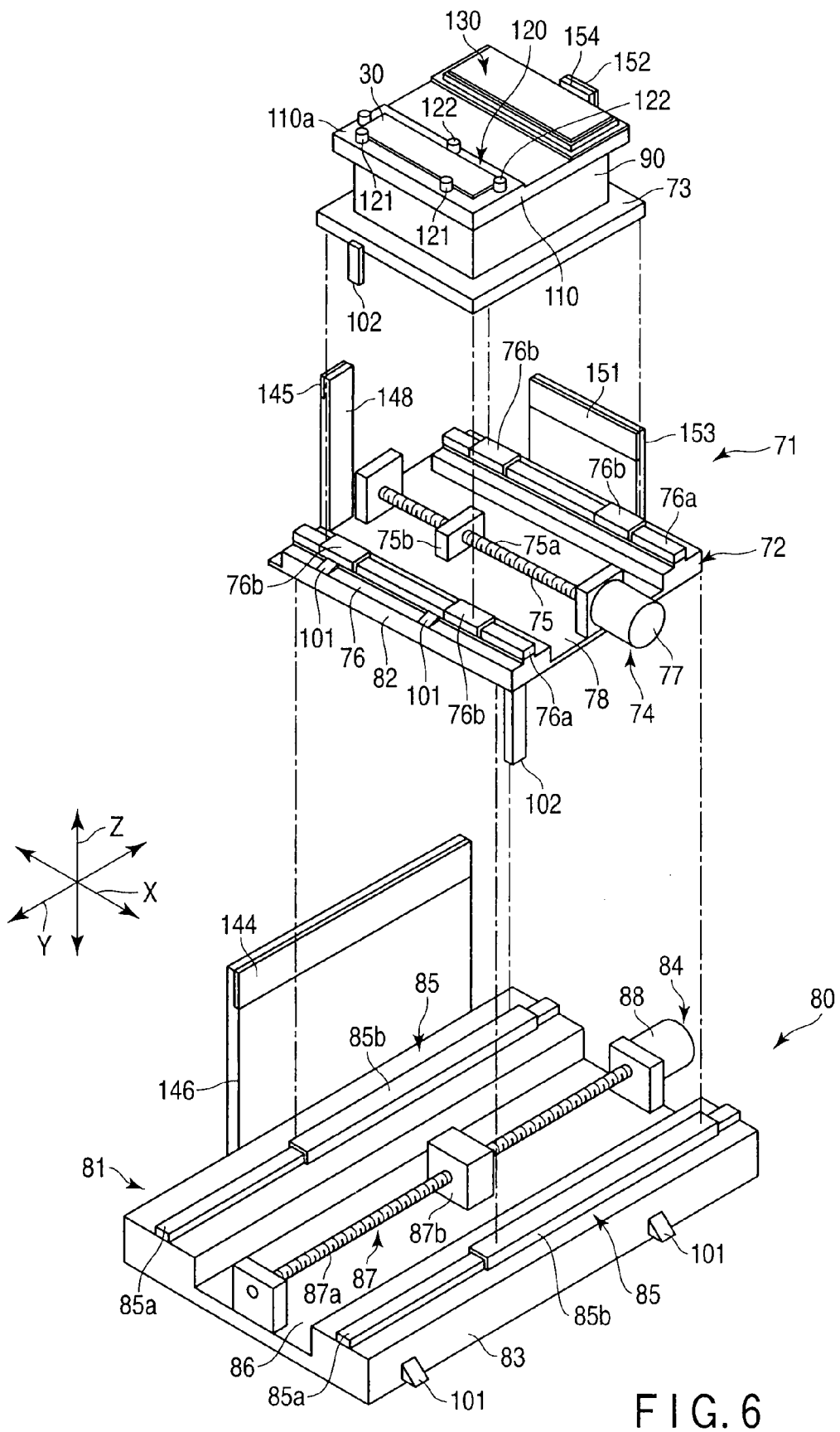
FIG. 6 is an exploded perspective view of the holding part shown in FIG. 5.

FIG. 5 shows the holding part 60. FIG. 6 is an exploded perspective view of the holding part 60. As shown in FIGS. 5 and 6, the holding part 60 comprises an X, Y stage 70, a holding table 90, and a processing stage 110, onto which the printer head 30 is fixed. The X, Y stage 70 allows the printer head 30 to move in an X axis direction X and a Y axis direction Y perpendicular to each other. The holding table 90 allows the printer head 30 to move in a Z axis direction Z perpendicular to the moving directions of the X, Y stage 70.

The X axis direction X is an example of the first direction of the present invention. The Y axis direction Y is an example of the second direction of the present invention. The Z axis direction Z is an example of the third direction of the present invention. In the present embodiment, the holding part 60 can be moved in the three directions X, Y, and Z, perpendicular to each other, by the X, Y stage 70 and the holding table 90; however, the holding part 60 may be allowed to be moved by other mechanisms.

The X, Y stage 70 comprises an X axis direction moving part 71 and a Y axis direction moving part 80. The Y axis direction moving part 80 allows the processing stage 110 to move in one of the above two directions. The X axis direction moving part 71 allows the processing stage 110 to move in the other of the two directions.

The Y axis direction moving part 80 comprises a Y axis stage driving part 81 and a Y axis stage 82. The Y axis stage driving part 81 can displace the Y axis stage 82 in the Y axis direction Y that is one of the moving directions of the printer head 30 and movably supports the Y axis stage 82 to the desired position. In the present embodiment, the direction in which the Y axis stage 82 can move is the Y axis direction Y. The Y axis stage driving part 81 comprises a base 83 for Y axis, a driving mechanism 84 for Y axis, and guide parts 85 for Y axis.

The base 83 for Y axis is disposed and fixed onto a floor 5 such as of a building containing the processing apparatus 10, for example. The base 83 has a shape elongated in the Y axis direction Y. The base 83 has at its middle a concave 86 extending in the Y axis direction Y. The floor 5 is partially illustrated in FIG. 5.

The driving mechanism 84 comprises a ball screw 87 for Y axis and an actuator 88 for Y axis. The ball screw 87 is contained in the concave 86 of the base 83 to be supported therein. A screw portion 87a of the ball screw 87 extends in the Y axis direction Y. The actuator 88 rotates the screw portion 87a around the shaft center line, that is, the Y axis direction Y, and, at the same time, controls the rotation of the screw portion 87a.

When the screw portion 87a is rotated by the actuator 88, the position of a nut 87b assembled on the screw portion 87a displaces along the screw portion 87a, whereby the nut 87b performs linear motion in parallel with the Y axis direction Y.

The guide part 85 comprises a pair of guide rails 85a and a pair of slide portions 85b. The guide rails 85a are respectively fixed to the respective sides of the base 83 so that the concave 86 is located between the guide rails 85a. The guide rails 85a extend in parallel with the Y axis direction Y.

One slide portion 85b is assembled on one guide rail 85a, and the slide portions 85b can slide along the guide rails 85a.

The Y axis stage 82 has a plate shape, for example, and is fixed to the slide portion 85b. The nut 87b is fixed to the Y axis stage 82. Therefore, when the actuator 88 is driven to rotate the screw portion 87a, the Y axis stage 82 displaces in parallel with the Y axis direction Y according to the displacement of the nut 87b. At this time, each of the slide portions 85b slides with respect to the corresponding guide rail 85a, whereby the Y axis stage 82 is guided.

The X axis direction moving part 71 comprises an X axis stage driving part 72 and an X axis stage 73. The X axis stage driving part 72 movably supports the X axis stage 73 in parallel with the X axis direction X that is one direction perpendicular to the Y axis direction Y.

The X axis stage driving part 72 comprises a driving mechanism 74 for X axis and guide parts 76 for X axis. The driving mechanism 74 comprises a ball screw 75 for X axis and an actuator 77 for X axis. The Y axis stage 82 has a function as a base of the X axis direction moving part 71.

The Y axis stage 82 has a concave 78 provided at substantially the middle in the Y axis direction Y on the opposite side of the base 83 for Y axis. The concave 78 extends in the X axis direction X perpendicular to the Y axis direction Y. A screw portion 75a of the ball screw 75 is contained in the concave 78 to be supported therein. The screw portion 75a extends in parallel with the X axis direction X.

The actuator 77 is assembled on the screw portion 75a. The actuator 77 rotates the screw portion 75a around the center axis line, and, at the same time, controls the rotation of the screw portion 75a. When the screw portion 75a is rotated, the nut 75b assembled on the screw portion 75a is displaced along the screw portion 75a. In other words, the nut 75b is displaced in parallel with the X axis direction X by the actuator 77.

The guide part 76 comprises a pair of guide rails 76a for X axis and plural, such as four slide portions 76b for X axis. The guide rails 76a are respectively disposed and fixed to the respective sides of the Y axis stage 82 so that the concave 78 is located between the guide rails 76a and extend in parallel with the X axis direction X. The Y axis stage 82 functions as the base of the X axis direction moving part 71. Two slide portions 76b are slidably assembled on one guide rail 76a so as to follow the guide rail 76a. The slide portions 76b disposed on the same guide rail 76a are spaced from each other in the X axis direction X on the guide rail 76a.

The X axis stage 73 has a plate shape, for example, and is fixed onto the slide portions 76b. The nut 75b is fixed to the X axis stage 73. Therefore, when the screw portion 75a is rotated by the actuator 77, the X axis stage 73 displaces in parallel with the X axis direction X following the displacement of the nut 75b.

The X axis direction moving part 71 and the Y axis direction moving part 80 comprise a stopper mechanism 100 regulating each movement of the X axis stage 73 and the Y axis stage 82. The stopper mechanism 100 comprises first engaging portions 101 and second engaging portions 102.

The base 83 and the Y axis stage 82 comprise the two first engaging portions 101, and the Y axis stage 82 and the X axis stage 73 comprise the second engaging portion 102.

The first engaging portions 101 of the base 83 are provided on the peripheral surface of the base 83 in the Y axis direction Y so as to protrude outside and are separated from each other in the Y axis direction Y. The second engaging portion 102 of the Y axis stage 82 is provided at the peripheral edge of the Y axis stage 82 in the Y axis direction Y and protrudes toward the base 83. The second engaging portion 102 is provided between the two first engaging portions 101 in the Y axis direction Y. The second engaging portion 102 is abutted against the first engaging portion 101, whereby the movement of the Y axis stage 82 is stopped. The distance between the first engaging portions 101 is arbitrarily set.

A pair of the first engaging portions 101 is also provided at the peripheral edge of the Y axis stage 82 in the X axis direction X. The first engaging portions 101 are disposed to be spaced from each other in the X axis direction X. The second engaging portion 102 is also provided on the X axis stage 73 in the X axis direction X. The second engaging portion 102 is disposed between the two first engaging portions 101 of the Y axis stage 82. In the movement of the X axis stage 73, the second engaging portion 102 is abutted against the first engaging portion 101, whereby the movement of the X axis stage 73 is stopped. The distance between the two first engaging portions 101 is arbitrarily set.

The holding table 90 is fixed to the X axis stage 73. The processing stage 110 is fixed to the holding table 90. Therefore, the processing stage 110 can be displaced in the X and Y axis directions X and Y by the Y axis direction moving part 80 and the X axis direction moving part 71. A surface 110a of the processing stage 110 parallels a virtual plane defined by the X and Y axis directions X and Y, and a processed object is placed on the surface 110a to be fixed thereonto.

The holding table 90 comprises a Z axis moving mechanism (not shown). The Z axis moving mechanism has a function of moving the processing stage in the Z axis direction Z. The Z axis direction Z crosses perpendicularly to the X and Y axis directions X and Y. In the present embodiment, the Z axis direction Z is the up and down directions in the drawings.

The upper face of the processing stage 110 parallels the virtual plane defined by the X and Y axis directions X and Y. A fixing mechanism 120 for fixing the printer head 30 is provided on the processing stage 110.

The fixing mechanism 120 comprises a vacuum chuck (not shown), two fixed pins 121, and two movable pins 122. The vacuum chuck is provided in the processing stage 110, for example, and fixes the printer head 30, disposed on the processing stage 110, by means of a suction force.

The fixed pins 121 and the movable pins 122 have a cylindrical shape, for example. The fixed pins 121 and the movable pins 122 surround and hold the peripheral edge of the printer head 30 on the processing stage 110 from the outside of the circumference of the printer head 30 toward the inside thereof and consequently support the printer head 30.

At this time, the printer head 30 is disposed and fixed onto the processing stage 110 so that the longitudinal direction A1 set above parallels the X axis direction X, and, at the same time, the crossing direction A2 parallels the Y axis direction Y.

The fixed pins 121 are fixed to the processing stage 110. The movable pins 122 are movable in the direction shown by the arrow of the drawing and are biased toward the printer head 30 by a biasing mechanism (not shown) so as to hold the printer head 30.

The structure of the fixing mechanism 120 is not limited to the above. For example, the printer head 30 may be fixed onto the processing stage 110 by other structures. Namely, the fixing mechanism 120 may have a function of fixing a processed object, such as the printer head 30, onto the processing stage 110.

FIG. 9 is a plan view of the processing stage 110. As shown in FIG. 9, a reference gauge 130 for positioning is fixed onto the processing stage 110. FIG. 10 is an enlarged plan view of the reference gauge 130. As shown in FIG. 10, the reference gauge 130 has a plate shape, for example.

The reference gauge 130 comprises a first reference mark 131 for a gauge and a second reference mark 132 for a gauge provided thereon. The relative positional relationship between the first reference mark 131 and the second reference mark 132 is the same as the relative positional relationship between the first reference mark 37 and the second reference mark 38 provided on the printer head 30. In the present embodiment, the relative positional relationship between the first reference mark 131 and the second reference mark 132 is the relative positional relationship in the X and Y axis directions X and Y excluding the positional relationship in the Z axis direction Z. Likewise, the relative positional relationship between the first reference mark 37 and the second reference mark 38 is the relative positional relationship in the X and Y axis directions X and Y excluding the positional relationship in the Z axis direction Z.

As shown in FIG. 9, the reference gauge 130 is disposed and fixed onto the processing stage 110 so that the first and second reference marks 131 and 132 are arranged in parallel with the X axis direction X.

The reference gauge 130 has a plurality of processing marks 133. The relative positional relationship in plan view between the processing marks 133 and the first and second reference marks 131 and 132 is the same as the relative positional relationship in the plan view, as viewed from above, between the first and second reference marks 37 and 38 of the printer head 30 and the positions where the nozzles 36 should be arranged on the polyimide film 33. In this embodiment, the relative positional relationship between the reference marks 133 and the first and second reference marks 131 and 132 is the relative positional relationship in the X and Y axis directions X and Y excluding the positional relationship in the Z axis direction Z.

In other words, the reference gauge 130 has the processing point marks 133 with the same numbers as the nozzles 36 to be formed on the polyimide film 33. The relative positional relationship in the plan view between those processing point marks 133 is the same as the relative positional relationship in the plan view between the nozzles 36 to be formed on the polyimide film 33. The relative positional relationship in the plan view is the relative positional relationship in the X and Y axis directions X and Y excluding the relative positional relationship in the Z axis direction Z. In FIG. 10, the processing point marks 133 are exaggeratingly shown.

As shown in FIGS. 5 and 6, the position detecting unit 140 comprises a Y axis coordinate measuring instrument 141, which detects the position of the processing stage 110 in the Y axis direction Y, an X axis coordinate measuring instrument 142, which detects the position of the processing mechanism 110 in the X axis direction X, and a laser displacement sensor 143 which detects the position of the working point on the polyimide film 33 in the Z axis direction Z, that is, the position of the point to which the laser beam is applied. In the present embodiment, the positions of the X, Y, and Z axis directions X, Y, and Z are represented by coordinates.

As shown in FIG. 6, a linear encoder is used as an example of the Y axis coordinate measuring instrument 141. The Y axis coordinate measuring instrument 141 is an example of a position measuring instrument and the first position measuring instrument of the present invention. The Y axis coordinate measuring instrument 141 comprises a linear scale 144 for Y axis and an index scale 145 for Y axis.

The linear scale 144 is fixed to a supporting part 146 fixed to the base 83 of the Y axis direction moving part 80. The linear scale 144 is formed of a light transmissive material such as glass and has a plate shape. The linear scale 144 comprises chrome metals provided at a constant interval. Therefore, in the linear scale 144, bright portions and dark portions are generated at a constant interval in the Y axis direction Y.

Figure 7:
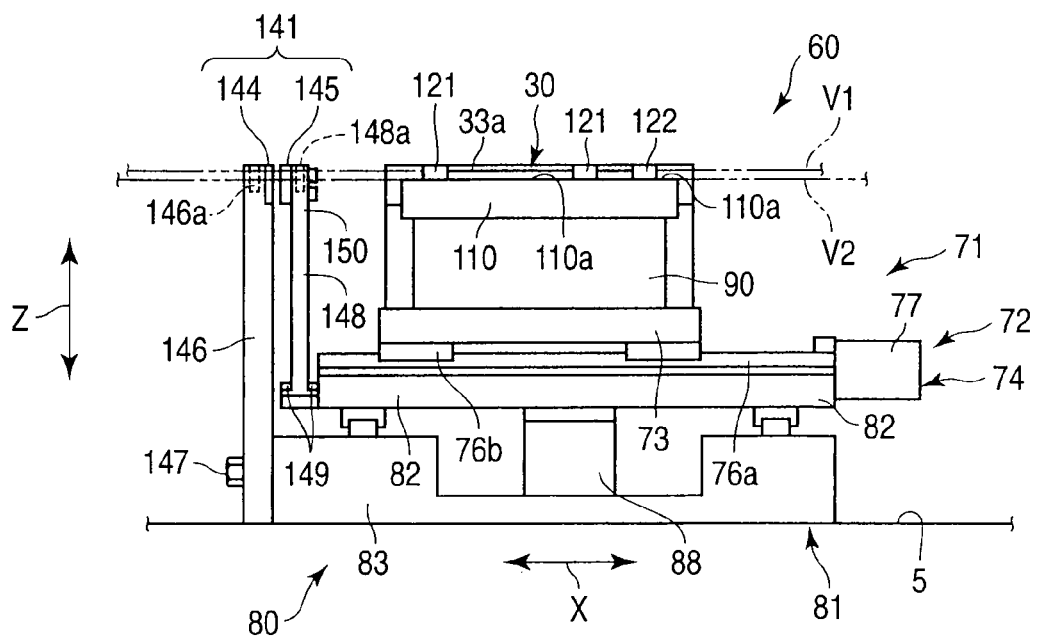
FIG. 7 is a side view of the holding part shown in FIG. 5 as viewed in a Y axis direction.

FIG. 7 is a side view of the holding part 60 as viewed in the Y axis direction Y. As shown in FIGS. 6 and 7, the supporting part 146 has a plate shape, for example, and is fixed to the peripheral surface of the base 83 in the Y axis direction Y by means of a bolt 147, for example. The linear scale 144 is fixed to the upper end of the supporting part 146, that is, the end on the opposite side of the base 83 and disposed so that the direction of arrangement of the bright and dark portions attributable to chrome plating parallels the Y axis direction Y.

The index scale 145 is fixed to a supporting part 148 fixed to the Y axis stage 82. The supporting part 148 is fixed to the peripheral edge portion of the Y axis stage 82 facing the supporting part 146 and is fixed with, for example, bolts 149. The index scale 145 is fixed to an end portion 150 of the supporting part 148, that is, the opposite side of the Y axis stage 82 and disposed so as to face the linear scale 144.

The Y axis stage 82 can relatively displace with respect to the base 83 in parallel with the Y axis direction Y. Therefore, the relative position between the index scale 145 and the linear scale 144 can displace in the Y axis direction Y while the index scale 145 and the linear scale 144 face the X axis direction X. In other words, the index scale 145 can move in the Y axis direction Y with respect to the linear scale 144.

A light-emitting element 146a is incorporated in the supporting part 146. A light-receiving element 148a is incorporated in the supporting part 148. The light emitted from the light-emitting element 146a passes through the linear scale 144 and the index scale 145 to be detected by the light-receiving element 148a. The light-emitting element 146a and the light-receiving element 148a are shown by the dashed line.

At this time, when the index scale 145 displaces in the Y axis direction Y with respect to the linear scale 144, that is, when the Y axis stage 82 displaces in the Y axis direction Y, the bright and dark portions of the linear scale 144 cause the generation of brightness and darkness of the light detected by the light-receiving element 148a. The brightness and darkness of the light detected by the light-receiving element 148a is counted, whereby the coordinate of the processing stage 110 in the Y axis direction Y is detected.

The light-emitting element 146a and the light-receiving element 148a are connected to the individual control device 200 to be described later, and the position of the processing stage 110 is grasped by the individual control device 200.

Next, the positions of the linear scale 144 and the index scale 145 are specifically described. As shown in FIG. 7, the linear scale 144 and the index scale 145 are configured so that their heights are the same as the height of the printer head 30 on the processing stage 110 in the Z axis direction Z.

In the present embodiment, when the heights of the linear scale 144, the index scale 145, and the printer head 30 on the processing stage 110 are the same in the Z axis direction Z, there is included a case where their heights are precisely the same, and, in addition to this, there is further included a case where the linear scale 144, specifically at least a portion of a part performing actual detection such as the light-emitting element 146a, the index scale 145, specifically at least a portion of a part performing actual detection such as the light-receiving element 148a, and at least a portion of the printer head 30 are located on the same plane vertically crossing the Z axis direction Z.

In the present embodiment, the surface 33a of the polyimide film 33 and a portion of a detector such as a sensor, which actually detects a position, such as the light-receiving element 148a and the light-emitting element 146a are located on a virtual plane V1 defined by the X and Y axis directions X and Y. The virtual plane V1 is an example of a plane vertically crossing the Z axis direction Z.

Therefore, the linear scale 144, specifically a portion performing actual detection such as the light-emitting element 146a, and the index scale 145, specifically a portion performing actual detection such as the light-receiving element 148a are arranged on an extension surface V2 of the surface 110a of the processing stage 110. The extension surface V2 is shown by the two-dot chain line in the drawings.

The structure of the Y axis coordinate measuring instrument 141 is not limited to the above. In short, the Y axis coordinate measuring instrument 141 may detect coordinates in the Y axis direction Y. It is preferable that a mechanism for measuring a position and a processed object are located at the same position in the Z axis direction Z. More preferably, a detector such as a sensor actually detecting a position and a surface of a processed object may be located on the virtual plane V1 defined by the moving directions of the processed object.

The detector is the light-receiving element 148a and the light-emitting element 146a of the present embodiment. The surface of the processed object is the surface 33a of the polyimide film 33 of the present embodiment. The moving directions of the processed object are the X and Y axis directions X and Y of the present embodiment.

When the light-emitting element 146a and the light-receiving element 148a are arranged on the virtual plane V1, the arrangement includes the case where they are located at a position overlapping with the virtual plane V1.

Preferably, the detector such as a sensor actually detecting a position may be disposed on the extension surface V2 of the surface 110a of the processing stage 110. The detector is the light-receiving element 148a and the light-emitting element 146a of the present embodiment.

Figure 8:
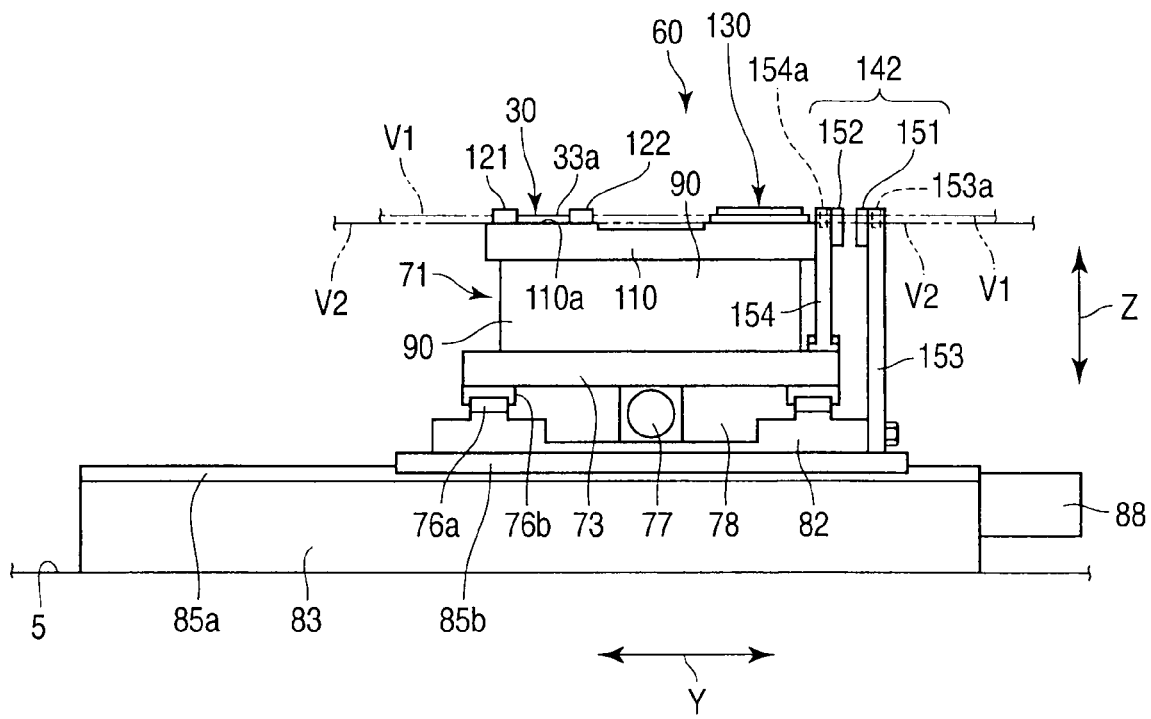
FIG. 8 is a side view of the holding part shown in FIG. 5 as viewed in an X axis direction.

FIG. 8 is a side view of the holding part 60 as viewed along the X axis direction X. As shown in FIG. 8, a linear encoder is used as an example of the X axis coordinate measuring instrument 142. The X axis coordinate measuring instrument 142 is an example of the position measuring instrument and the second position measuring instrument of the present invention. The X axis coordinate measuring instrument 142 comprises a linear scale 151 for X axis and an index scale 152 for X axis.

The linear scale 151 is fixed to a supporting part 153 fixed to the peripheral surface in the X axis direction X of the Y axis stage 82. The linear scale 151 may have a similar structure to the linear scale 144 of the Y axis coordinate measuring instrument 141. The linear scale 151 is disposed and fixed to the end of the supporting part 153, that is, the end on the opposite side of the Y axis stage 82, so that the direction in which bright and dark portions are arranged parallels the X axis direction X.

The index scale 152 is fixed to a supporting part 154 fixed to the peripheral edge portion of the X axis stage 73 facing the supporting part 153. The supporting part 154 is disposed so as to face the supporting part 153. The index scale 152 is disposed at the end of the supporting part 154, that is, the end on the opposite side of the X axis stage 73, so as to face the linear scale 151 in the Y axis direction Y.

The X axis stage 73 can relatively displace in the X axis direction X with respect to the Y axis stage 82. Therefore, the relative position between the index scale 152 and the linear scale 151 can displace in the X axis direction X while the index scale 152 and the linear scale 151 face each other in the Y axis direction Y. In other words, the index scale 152 can move in the X axis direction X with respect to the linear scale 151.

The supporting part 153 incorporates therein a light-emitting element 153a, and the supporting part 154 incorporates therein a light-receiving element 154a. The light emitted from the light-emitting element 153a passes through the linear scale 151 and the index scale 152 to be detected by the light-receiving element 154a.

When the index scale 152 displaces in the X axis direction X with respect to the linear scale 151, that is, when the X axis stage 73 displaces in the X axis direction X, the bright and dark portions generated in the linear scale 151 cause the generation of brightness and darkness of the light detected by the light-receiving element 154a. The brightness and darkness of the light detected by the light-receiving element 154a is counted, whereby the coordinate of the processing stage 110 in the X axis direction X is detected.

The light-emitting element 153a and the light-receiving element 154a are connected to the individual control device 200 to be described later, and the position of the processing stage 110 is grasped by the individual control device 200.

Next, the positions of the linear scale 151 and the index scale 152 are specifically described. As shown in FIG. 8, the linear scale 151 and the index scale 152 are configured so that their heights are the same as the height of the printer head 30 on the processing stage 110 in the Z axis direction Z.

More specifically, the surface 33a of the polyimide film 33 and a detector such as a sensor, which actually detects a position such as of the light-receiving element 154a and the light-emitting element 153a are located on the virtual plane V1 defined by the X and Y axis directions X and Y.

In the present invention, when the heights of the linear scale 151, the index scale 152, and the printer head 30 on the processing stage 110 are the same in the Z axis direction Z, there is included a case where their heights are precisely the same, and, in addition to this, there is further included a case where the linear scale 151, specifically at least a portion of a part performing actual detection such as the light-emitting element 153a, the index scale 152, specifically at least a portion of a part performing actual detection such as the light-receiving element 154a, and the printer head 30 are located on the same plane vertically crossing the Z axis direction Z.

In the present embodiment, the surface of the polyimide film 33 and a portion of a detector such as a sensor, which actually detects a position such as of the light-emitting element 153a and the light-receiving element 154a are located on the virtual plane V1 defined by the X and Y axis directions X and Y. The virtual plane V1 is an example of a plane vertically crossing the Z axis direction Z.

Therefore, the linear scale 151, specifically a portion performing actual detection such as the light-emitting element 153a, and the index scale 152, specifically a portion performing actual detection such as the light-receiving element 154a are arranged on the extension surface V2 of the surface 110a of the processing stage 110. The extension surface V2 is shown by the two-dot chain line in the drawings.

The structure of the X axis coordinate measuring instrument 142 is not limited to the above. In short, the X axis coordinate measuring instrument 142 may detect coordinates in the X axis direction X. It is preferable that a mechanism for measuring a position and a processed object are located at the same height. More preferably, a detector such as a sensor actually detecting a position and a working point of a processed object may be located on the virtual plane V1 defined by the X and Y axis directions X and Y. The detector is the light-receiving element 154a and the light-emitting element 153a of the present embodiment. The working point of the processed object is the surface 33a of the polyimide film 33 of the present embodiment.

When the light-emitting element 153a and the light-receiving element 154a are arranged on the virtual plane V1, the arrangement includes the case where they are located at a position overlapping with the virtual plane V1.

The detector such as a sensor actually detecting a position may be disposed on the extension surface V2 of the surface 110a of the processing stage 110. The detector is the light-receiving element 154a and the light-emitting element 153a of the present embodiment.

The natural frequencies of the supporting parts 146, 148, 153 and 154 are determined in consideration of the installation environment of the processing apparatus 10, specifically, in such a manner that the natural frequencies differ from the natural frequency of the entire holding part 60 and from the natural frequency of a portion where the X-Y stage 70 is fixed in a building. The portion fixed with the X, Y stage 70 is the floor 5 of the present embodiment. The floor 5 is an example of the portion on which the holding part of the present invention is placed.

For example, the selection of members constituting the supporting parts 146, 148, 153, and 154 and their shapes are considered so that the natural frequencies of the supporting parts 146, 148, 153, and 154 are larger than the natural frequency of the entire holding part 60 and the natural frequency of the floor 5.

The supporting parts 146 and 148 are considered so as to be prevented from being bended by an inertial force during acceleration and deceleration of the movement of the Y axis stage 82 in the Y axis direction Y. For example, the supporting parts 146 and 148 have a predetermined width in the Y axis direction Y, and therefore, the deformation in the Y axis direction Y is suppressed. Alternatively, the selection of materials constituting the supporting parts 146 and 148 and their shapes are considered.

Likewise, the supporting parts 153 and 154 are considered so as to be prevented from being deflected by an inertial force during acceleration and deceleration of the movement of the X axis stage 73 in the X axis direction X. For example, the supporting parts 153 and 154 have a predetermined width in the X axis direction X, and therefore, the deformation in the X axis direction X is suppressed. Alternatively, the selection of materials constituting the supporting parts 153 and 154 and their shapes are considered.

As shown in FIG. 1, the laser displacement sensor 143 is provided at a position apart from the processing stage 110 in the Z axis direction Z. The laser displacement sensor 143 detects the position along the Z axis direction Z of each working point of the surface 33a of the polyimide film 33, that is, the position at which the nozzle 36 is formed.

For example when the surface 33a of the polyimide film 33 is distorted, the variation in position with a very small value in the Z axis direction Z may occur due to the distortion. Therefore, a point to which the laser beam is actually applied should be accurately measured.

The laser displacement sensor 143 uses a "confocal principle" for example and is a displacement gauge detecting the focal distance of a lens. The focal point of the laser beam emitted from the laser displacement sensor 143 is made to coincide with the working point on the polyimide film 33, that is, the point at which the nozzle 36 is formed, whereby the position of the processing point along the Z axis direction Z is detected.

The laser displacement sensor 143 is connected to the individual control device 200 to be described later, and the position of the working point on the printer head 30 in the Z axis direction Z, to which the laser beam is applied, is grasped by the individual control device 200.

Although the working point along the Z axis direction Z, that is, the point to which the laser beam is applied is detected by using the laser displacement sensor 143, the position of the processing point along the Z axis direction Z may be detected by a device other than the laser displacement sensor 143. In short, the position along the Z axis direction Z of the working point on the polyimide film 33, that is, the position to which the laser beam is applied may be detected.

The variation in position in the Z axis direction Z of each working point caused by the distortion of the surface 33a of the polyimide film 33 is very small. Therefore, in the present embodiment, even when the processing stage 110 is displaced in the Z axis direction Z by the variation in position, the working point on the polyimide film 33 is located in the virtual plane V1 along with the light-emitting elements 146a and 153a and the light-receiving elements 148a and 154a. Likewise, the light-emitting elements 146a and 153a and the light-receiving elements 148a and 154a are located on the extension surface V2.

FIG. 4 shows a portion of the holding part 60 in the processing unit 50 and the vicinity thereof. The laser beam emitted from the laser oscillator 20 passes through the machining lens 160 to be collected at the working points on the polyimide film 33 at which the nozzles 36 are formed. Consequently, the nozzles 36 are formed on the polyimide film 33 by an ablation action.

As shown in FIGS. 1 and 4, the machining lens 160 is fixed to the position apart from the holding part 60 in the Z axis direction Z. The laser beam L passing through the machining lens 160 reaches the polyimide film 33.

As shown in FIG. 1, a mirror 170 is disposed and fixed between the laser oscillator 20 and the machining lens 160. The mirror 170 has a function of reflecting a portion of the laser beam L emitted from the laser oscillator 20 to guide the portion of the laser beam L to the machining lens 160, and, at the same time, allowing the remaining laser beam to transmit therethrough. Alternatively, the mirror 170 has a function of reflecting all the laser beams having reached thereto. The mirror 170 is an example of the mirror of the present invention.

The mirror 170 of each of the processing units 50 is specifically described. As shown in FIG. 1, the mirrors 170 of the processing units 50 are arranged in the advancing direction of the laser beam L emitted from the laser oscillator 20. In the present embodiment, the mirrors 170 are arranged linearly, for example.

Each of the mirrors 170 is configured so that the intensity of the laser beam L, which has been reflected by the mirror and thereafter reaches each of the printer head 30, remaining the same. In other words, each of the mirrors 170 is configured so that the intensity of the laser beam L, reaching the machining lens 160 of each of the processing units 50, remains the same in each of the processing units 50. In the present embodiment, the four processing units 50 are used, and therefore, each of the mirrors 170 is configured so that the laser beam L with the intensity of 25% of the laser beam L emitted from the laser oscillator 20 reaches the machining lens 160.

The mirror 170 to which the laser beam L emitted from the laser oscillator 20 first reaches, that is, the mirror 170 of the processing unit 50 disposed on the left side of FIG. 1 has characteristics reflecting 25% of the laser beam emitted from the laser oscillator 20 and allowing 75% of the laser beam to transmit therethrough.

The mirror 170 to which the laser beam L emitted from the laser oscillator 20 next reaches, that is, the mirror 170 of the processing unit 50 which is the second processing unit from the left side of FIG. 1 has characteristics reflecting 33% of the laser beam L reaching thereto and allowing 67% of the laser beam L to transmit therethrough. The mirror 170 to which the laser beam L emitted from the laser oscillator 20 subsequently reaches, that is, the mirror 170 of the processing unit 50 which is the third processing unit from the left side of FIG. 1 has characteristics reflecting 50% of the laser beam L reaching thereto and allowing 50% of the laser beam L to transmit therethrough.

Regarding a plurality of the processing units 50, the mirror 170 of the processing unit 50 to which the laser beam L finally reaches, that is, the mirror 170 of the processing unit 50 disposed on the right side of FIG. 1 has characteristics reflecting 100% the laser beam L reaching thereto.

As described above, in the processing apparatus 10, by virtue of the use of the laser beam L emitted from one laser oscillator 20, the laser beam L is applied to all the processing units 50. Thus, although the four processing units 50 are used in FIG. 1, the number of the processing units 50 can be relatively easily increased or decreased.

Figure 11:
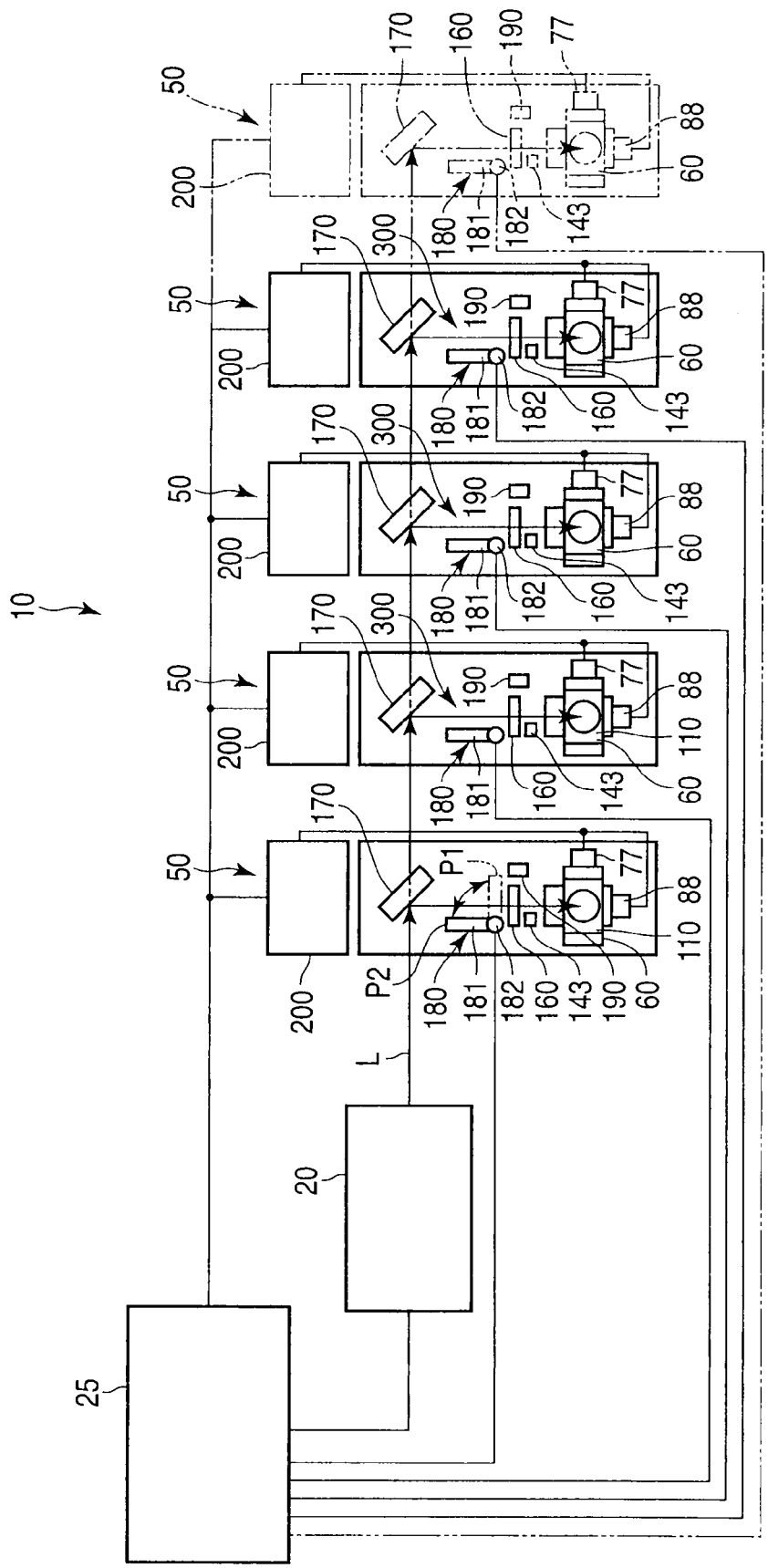
FIG. 11 is a schematic view of the processing apparatus shown in FIG. 1, to which one processing unit is further added.

In FIG. 11, one processing unit 50 is further added to the processing apparatus 10 of FIG. 1. In FIG. 11, the processing unit 50 added to the processing apparatus 10 of FIG. 1 is shown by the two-dot chain line.

As shown in FIG. 11, when the number of the processing units 50 is increased, the mirror 170 of each of the processing units 50 is changed. This is because the intensity of the laser beam L distributed to each of the processing units 50 is kept constant with the increase in the number of the processing units 50. Even when the number of the processing units 50 is decreased, the mirror 170 of each of the processing units 50 is also changed.

The mirror 170 and the machining lens 160 constitute an optical system 300 guiding the laser beam to the printer head 30. The optical system 300 is an example of the optical system of the present invention. The optical system 300 may be constituted of components other than the mirror 170 and the machining lens 160. In short, the optical system 300 is only required to guide the laser beam L to the printer head 30.

As shown in FIG. 1, the shutters 180 are arranged in the path of the laser beam L having been reflected by the mirror 170 to travel toward the machining lens 160. The shutter 180 comprises a main body 181 and a driving part 182.

The main body 181 has a function of blocking the laser beam L to prevent the laser beam L from reaching the machining lens 160. The main body 181 can displace between a position P1 blocking the laser beam L and a position P2 not blocking the travel of the laser beam L.

The main body 181 is displaced by the driving part 182. The driving part 182 is controlled by the overall control device 25. In a state that the main body 181 is located at the blocking position P1, the laser beam L having passed through the mirror 170 is applied to the main body 181 and thus blocked. Consequently, the laser beam L does not reach the machining lens 160, and therefore, the polyimide film 33 is not processed.

The structure of the shutter 180 is not limited to the above. In short, the shutter 180 may have a function of selectively blocking the laser beam L from reaching a working point of a processed object such as the polyimide film 33.

Figure 12:
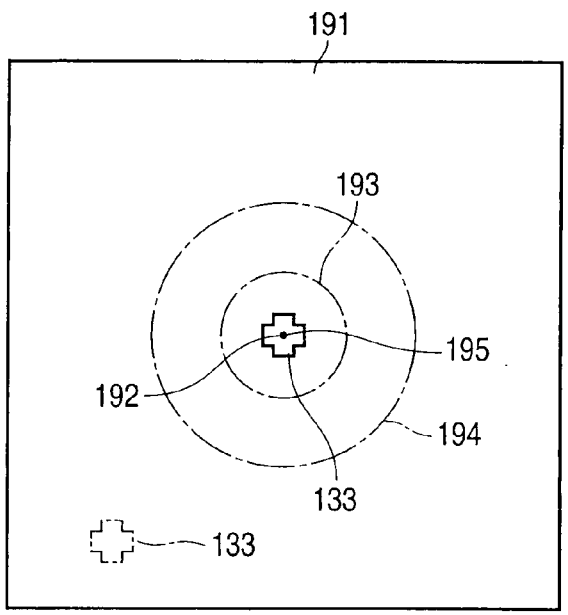
FIG. 12 is a view of an image taken by a camera shown in FIG. 4.

A camera 190 is an example of the photographing part of the present invention. As shown in FIG. 4, the camera 190 is fixed to a position apart from the processing stage 110 in the Z axis direction Z and does not move. The camera 190 takes an image on the processing stage 110. FIG. 12 shows an image 191 taken by the camera 190. In FIG. 12, a portion of the reference gauge 130 is photographed.

As shown in FIG. 12, not the entirety of the reference gauge 130 but a portion thereof is taken by the camera 190. In FIG. 12, the processing point mark 133 of the reference gauge 130 is photographed.

The coordinate position of the processing stage 110 measured by the X axis coordinate measuring instrument 142 and the Y axis coordinate measuring instrument 141 is the coordinate of a center position 195 of the image 191 taken by the camera 190. The individual control device 200 grasps the coordinates of all positions in the image 191 based on the coordinate of the center position 195 of the obtained image 191.

The positional relationship between the camera 190 and the machining lens 160 is described. The camera 190 and the machining lens 160 have such a positional relationship that in a state that the processing point mark 133 is located at the center position 195 of the image 191 taken by the camera 190, the laser beam L passing through the machining lens 160 is applied to the working point of the nozzle 36 which should be formed on the polyimide film 33, the working point corresponding to the processing point mark 133 located at the center position 195 of the image 191.

The positional relationship is ideal, and it is realized when there are no positional deviation of the printer head 30 with respect to the processing stage 110 and no machine-specific operation error, that is, the operation error of the X, Y stage 70. In fact, various errors may occur. The correction for the various errors will be described in detail later.

As shown in FIG. 1, the individual control device 200 controls the operation of the actuator 88, the operation of the actuator 77, and the operation of the Z axis moving mechanism. Specifically, the individual control device 200 controls each operation of the actuators 77 and 88 to move the position of the printer head 30 fixed onto the processing stage 110 so that the laser beam L reaches the desired position, that is, the position at which the nozzle 36 should be formed. The individual control device 200 further controls the operation of the Z axis moving mechanism so that the laser beam L is focused at the desired position.

The individual control device 200 is connected to the camera 190. The individual control device 200 detects the coordinate of the processing stage 110 from the image 191 taken by the camera 190 and detects the coordinates of all positions in the image 191 based on the obtained coordinate. In the present embodiment, the coordinate of the processing stage 110 is the coordinate of the center position 195 of the taken image.

The individual control device 200 has each data of the coordinates of the first and second reference marks 131 and 132 and all the processing point marks 133 in the reference gauge 130. The individual control device 200 further has coordinate data of the position of the processing stage 110 where the printer head 30 should be disposed, specifically data of the coordinate where the first and second reference marks 37 and 38 should be disposed. The coordinate data of each of the processing point marks 133 is previously input.

Figure 13:
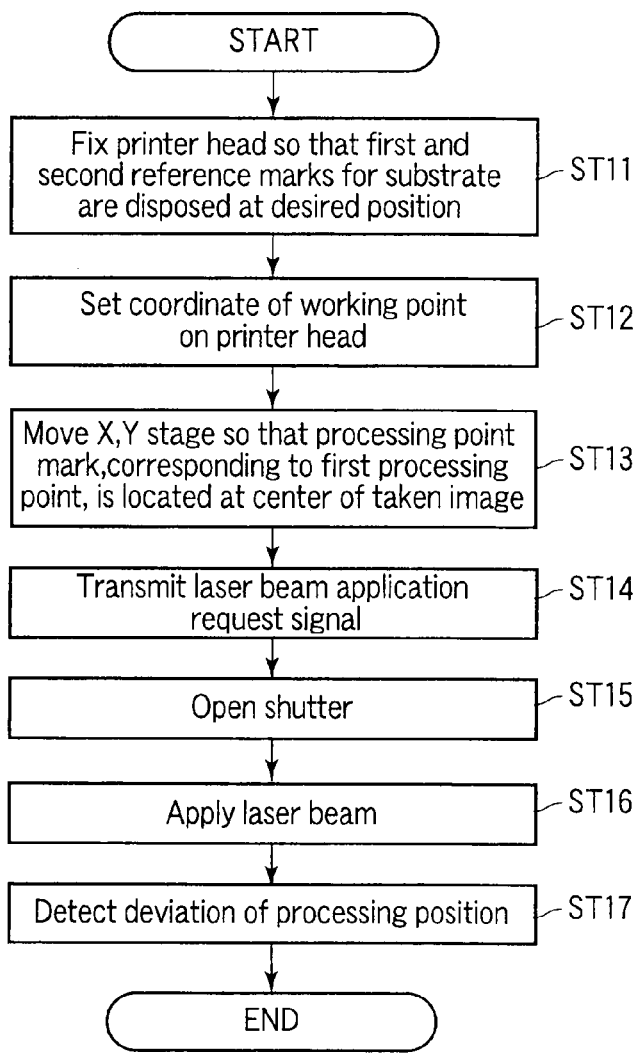
FIG. 13 is a flow chart showing the first-time operation of the processing apparatus shown in FIG. 1.

Next, the operation of the processing apparatus 10 is described. The first-time operation of the processing apparatus 10 is described. FIG. 13 is a flow chart showing the first-time operation of the processing apparatus 10. In the first-time operation of the processing apparatus 10, the error peculiar to each of the processing units 50 is detected. In the error detection, the operation error of the X, Y stage 70 and deviation of the application position of the laser beam L are detected.

As shown in FIG. 13, in step ST11, the printer head 30 is fixed onto the processing stage 110 of each of the processing units 50 by the fixing mechanism 120. At this time, the first and second reference marks 37 and 38 are disposed on the processing stage 110 at a position where the first and second reference marks 37 and 38 should be positioned.

Specifically, the X-Y stage 70 is moved, and the first and second reference marks 37 and 38 are taken by the camera 190, whereby it is confirmed whether the first and second reference marks 37 and 38 are disposed at the position where they should be disposed. If they are not, fine adjustment is repeated, whereby the first and second reference marks 37 and 38 are precisely positioned.

Next, the flow proceeds to step ST12. In step ST12, a coordinate for processing the nozzle 36 is set on the polyimide film 33 of the printer head 30. Specifically, the coordinate of the point, at which the nozzle 36 is formed, with respect to the first and second reference marks 37 and 38 is generated on the polyimide film 33 so that the relative positional relationship in the plan view between the first and second reference marks 37 and 38 and each of the nozzles 36 is the same as the relative positional relationship in the plan view between the first and second reference marks 131 and 132 and each of the processing point marks 133.

Next, the flow proceeds to step ST13. In ST13, the individual control device 200 controls the X, Y stage 70 to correspond the application position of the laser beam L to the position of the nozzle 36 to be first processed on the polyimide film 33. Further, the position in the Z axis direction Z of the processing position of the nozzle 36 to be first processed is detected by the laser displacement sensor 143, and the position in the Z axis direction Z of the processing position is positioned. After the positioning of the processing point, the flow proceeds to step ST14.

In step ST14, each of the individual control devices 200 transmits a laser beam application request signal to the overall control device 25. Then, the flow proceeds to step ST15.

In step ST15, when the overall control device 25 confirms that the laser beam application request has been received from the individual control devices 200 of all the processing units 50, the shutter 180 of each of the processing units 50 is opened. The opening of the shutter in the present embodiment means that the main body 181 is moved to the position P2 so that the laser beam L reaches the polyimide film 33. The closing of the shutter 180 means that the main body 181 is moved to the position P1 so as to prevent the laser beam L from reaching the polyimide film 33. Then, the flow proceeds to step ST16.

In step ST16, the overall control device 25 controls the laser oscillator 20 to allow the laser oscillator 20 to apply the laser beam L. The laser oscillator 20 applies the laser beam L of 200 Hz for 1 second, for example. The nozzle 36 is formed at the working point, subjected to the laser beam application, by an ablation action. In the present embodiment, a time required for a single application of the laser beam L is 1 second, which is necessary for the formation of the nozzle 36. The laser beam application time is set so as to be optimized according to a processed object. The overall control device 25 applies the laser beam L for 1 second and then closes the shutter 180 of each of the processing units 50. Then, the flow proceeds to step ST17.

In ST17, the error of the position of the processed nozzle 36 is confirmed. For example, the processed nozzle 36 is taken by the camera 190, and the position coordinate where the nozzle 36 is formed is detected, whereby the error is detected. The confirmation is not limited, but may be performed by using a separately provided device for confirmation. In short, when there is an error at the position of the nozzle 36, the error may be accurately detected.

The error data, which is the error peculiar to each of the processing units 50, is input to each of the individual control devices 200. In the subsequent processing of the nozzle 36, the error data is used for the correction of the movement of the X, Y stage 70.

Figure 14:
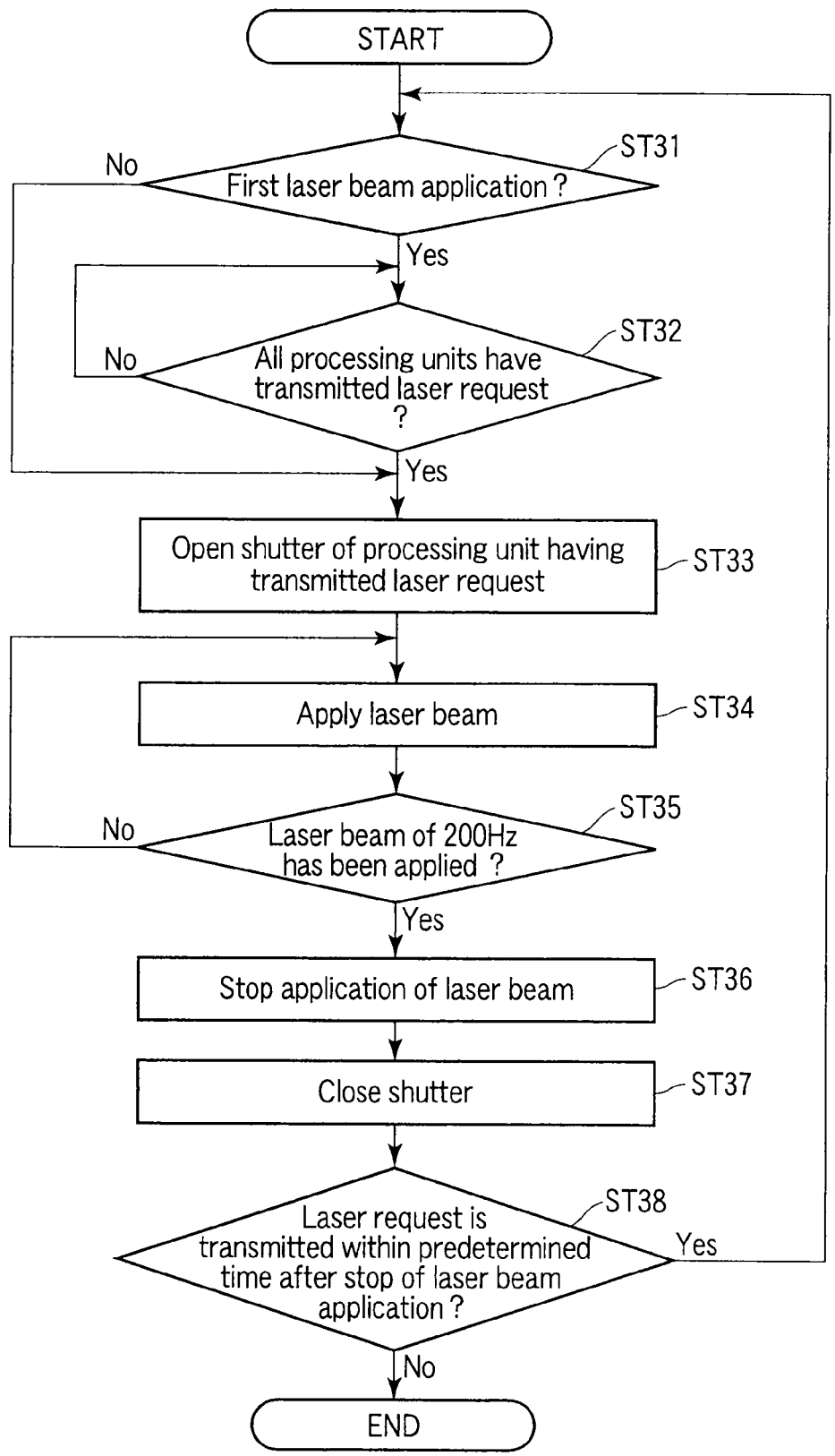
FIG. 14 is a flow chart showing an example of a control as viewed from the side of an overall control device shown in FIG. 1.
Figure 15:
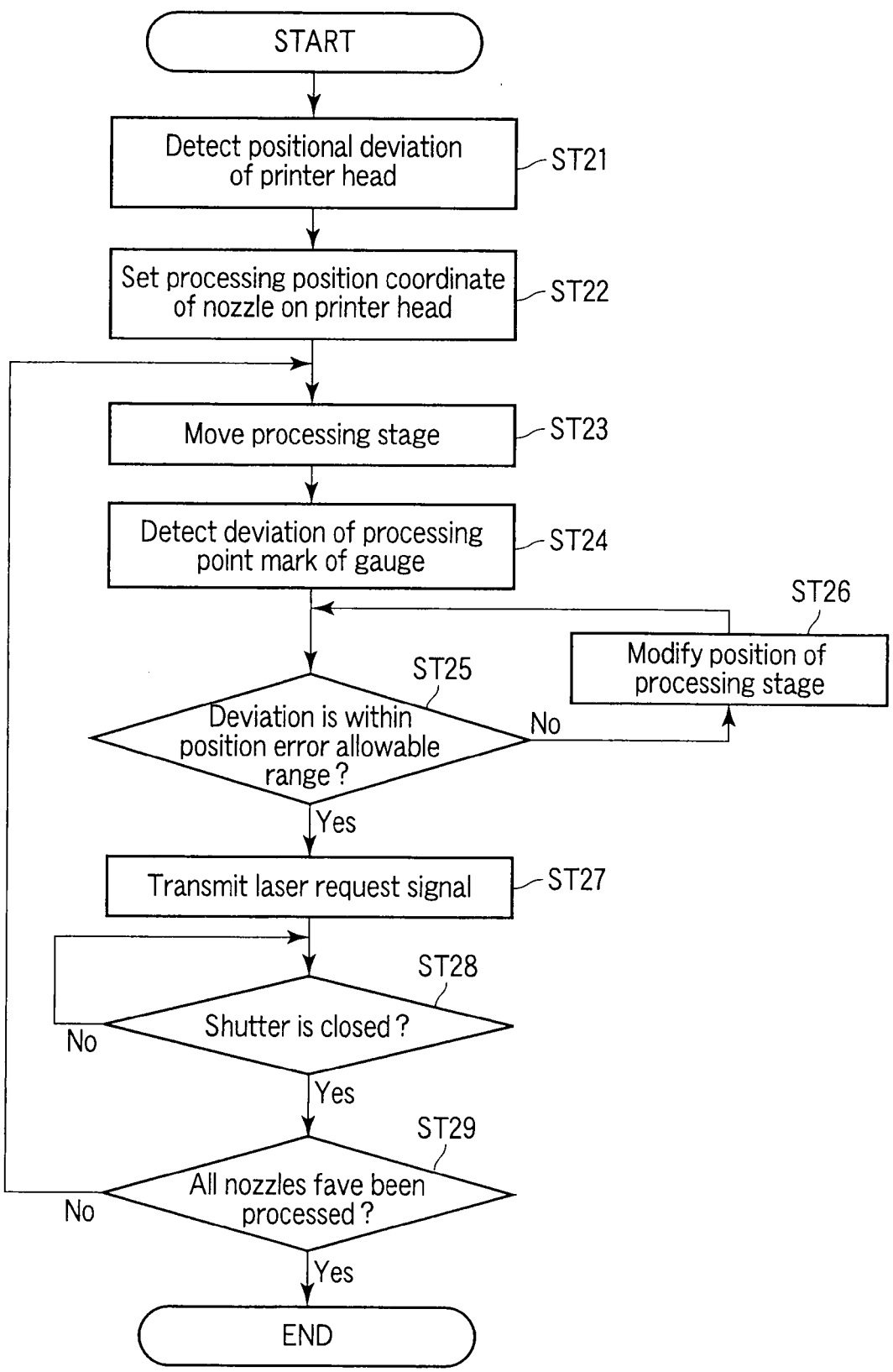
FIG. 15 is a flow chart showing an example of a control as viewed from the side of an individual control device shown in FIG. 1.

Next, a normal operation of the processing apparatus 10 is described. FIG. 14 is a flow chart showing an example of a control as viewed from the side of the overall control device 25. FIG. 15 is a flow chart showing an example of a control as viewed from the side of the individual control device 200.

As shown in FIG. 15, in step ST21, an operator arranges the printer head 30 on the processing stage 110 of each of the processing units 50 before the formation of the nozzles 36 on the polyimide film 33 and fixes the printer head 30 by means of the fixing mechanism 120.

When the printer head 30 is fixed onto each of the processing stages 110, the operator presses an operation starting switch (not shown) of the individual control device 200 to allow the processing units 50 to be in an operable state. The individual control device 200 then starts the operation. The individual control device 200 confirms the error of the position at which the printer head 30 is disposed.

Specifically, in step ST21, the individual control device 200 detects the coordinates of the first and second reference marks 37 and 38 of the printer head 30. Therefore, the individual control device 200 controls the actuators 77 and 88 to obtain the image 191 of the first and second reference marks 37 and 38 by means of the camera 190, and thus, to obtain the coordinates of the first and second reference marks 37 and 38 from the image 191.

Then, the coordinate data of the first and second reference marks 37 and 38 free from the positional deviation of the printer head 30 and the actually obtained coordinate data of the first and second reference marks 37 and 38 are compared with each other, and the positional deviation of the printer head 30 is detected. The coordinate data of the first and second reference marks 37 and 38 free from the positional deviation of the printer head 30 is the coordinates of the first and second reference marks 37 and 38 in a state that the printer head 30 is ideally fixed. The coordinate data is previously input to the individual control device 200. The flow then proceeds to step ST22.

In step ST22, the individual control device 200 detects the coordinate of the position, at which the nozzle 36 is actually formed, on the polyimide film 33 of the printer head 30. In other words, the individual control device 200 generates the coordinate data of the position to which the laser beam L is actually applied.

As described above, the relative positional relationship in the plan view between the first and second reference marks 131 and 132 and each of the processing point marks 133 in the reference gauge 130 is the same as the relative positional relationship in the plan view between the first and second reference marks 37 and 38 and the positions, where the nozzles 36 should be processed, in the printer head 30. Namely, when the relative positional relationships are the same in plane view, the relative positional relationships are the same on an X-Y plane, without the positional relationship in the Z axis direction Z being taken into account.

When the printer head 30 is disposed without positional deviation, if the processing point mark 133 is located at the center position 195 of the image 191 taken by the camera 190, the laser beam L is applied to the position at which the nozzle 36, corresponding to the processing point mark 133 and provided on the polyimide film 33, should be processed.

When the positional deviation of the printer head 30 is not detected in step ST21, the data of the coordinate to which the laser beam L is applied is generated so that the relative positional relationship in the plan view between the first and second reference marks 131 and 132 and the processing point marks 133 in the reference gauge 130 is the same as the relative positional relationship in the plan view between the first and second reference marks 37 and 38 and the positions, at which the nozzles 36 should be processed, in the printer head 30.

Meanwhile, FIG. 16 shows the processing stage 110 when the printer head 30 is fixed onto the processing stage 110 in a state that the position of the printer head 30 deviates from a predetermined position. The positional deviation of the printer head 30 shown in FIG. 16 is shown in large size with exaggeration. As shown in FIG. 16, if the printer head 30 is held and fixed while the position of the printer head 30 is deviated, in step ST22, the actual coordinate data of the first and second reference marks 37 and 38 obtained from an image taken by the camera 190 is compared with the data of a previously registered coordinate where the first and second reference marks 37 and 38 should be normally located, whereby the positional deviation of the printer head 30 is detected.

The printer head 30 is fixed onto the processing stage 110 while the position of the printer head 30 is deviated, whereby the positional relationship between the machining lens 160 and the printer head 30 is changed due to the deviation. Due to the deviation, even when the processing point mark 133 of the reference gauge 130 is disposed at the center position 195 of the image 191 of the camera 190, the laser beam L is not applied to the position that should be processed and corresponds to the processing point mark 133.

Therefore, in order to correct the deviation of the application position of the laser beam L occurring due to the deviation of the printer head 30, the individual control device 200 changes a recognition position 192 of the processing point mark 133 in the image 191. The recognition position 192 is such a position that when the center of the processing point mark 133 is disposed at the recognition position 192, the laser beam L is applied to a processed position on the polyimide film 33 corresponding to the processing point mark 133. The recognition position 192 is a photographing range of the camera 190, that is, a range that can be photographed by the camera 190, and is set within a range shown in the image 191; therefore, the recognition position 192 is disposed in the image 191.

FIG. 17 is the image 191 taken by the camera 190 after the above correction. As described above, when the fixed position of the printer head 30 is not deviated, the center position 195 of the image 191 is the recognition position 192 of the processing point mark 133, and the individual control device 200 controls the X, Y stage 70 so that the recognition position 192 and the center of the processing point mark 133 are overlapped with each other. However, as shown in FIG. 16, when the fixed position of the printer head 30 is deviated, the recognition position 192 of the processing point mark 133 in the image 191 is changed so that the deviation is compensated.

Further, when the processing unit 50 has an error peculiar to itself, that is, the error obtained from the description using FIG. 13, such as the operation error of the X, Y stage 70 and the error of the arrival point of the laser beam, such a correction is made that the recognition position 192 of the processing point mark 133 in the image 191 is changed, considering the error of the processing unit 50. In other words, the recognition position 192 is corrected to a position deviated from the center position 195 of the image 191 so that the error peculiar to the processing unit 50 and the error of the fixed position of the printer head 30 are corrected.

The recognition position 192 of the processing point mark 133 is corrected, whereby when the processing point mark 133 is located at the recognition position 192, the laser beam L is applied to the position at which the nozzle 36, provided on the polyimide film 33 and corresponding to the processing point mark 133, should be processed. Then, the flow proceeds to step ST23.

In step ST23, the individual control device 200 aligns the position of the polyimide film 33, where the nozzle 36 should be formed, with the position of the processing stage 110 to which the laser beam L is applied.

First, based on a previously stored coordinate of the processing point mark 133, the X, Y stage 70 is moved so that the position of the processing point mark 133 is aligned with the recognition position 192. This point will be specifically described.

Figure 18:
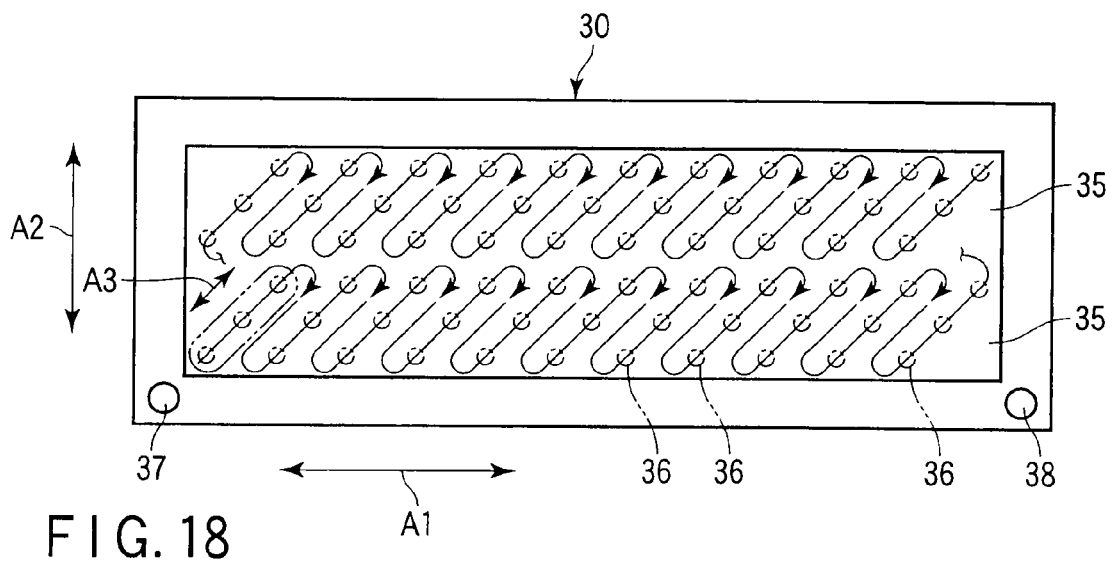
FIG. 18 is a plan view of the printer head in which nozzles to be processed are shown on a polyimide film before processing.

FIG. 18 shows the printer head 30 in which the coordinate data of the nozzles 36 to be processed is transferred on the polyimide film 33. In FIG. 18, the nozzles 36 to be processed are shown by the two-dot chain lines. The marks or the like drawn by the two-dot chain lines and used for indicating the positions of the nozzles 36 are not really provided in the printer head 30. FIG. 18 is used for the description of the processing of the nozzles 36.

As shown in FIG. 18, the three nozzles 36 are surrounded by the two-dot chain line and arranged in the oblique direction A3 obliquely to the longitudinal direction A1 and the crossing direction A2. A plurality of sets of the three nozzles 36 are arranged in the longitudinal direction A1 to constitute the lines 35. The lines 35 are provided as a pair in the crossing direction A2.

In the present embodiment, as an example, the laser beam L is applied in order, from one set of the nozzles 36 on the side of the first reference mark 37 toward each set on the side of the second reference mark 38. The order of applying the laser beam L to the nozzles 36 is shown by the arrow in FIG. 18.

First, the X, Y stage 70 is driven so that the processing point mark 133 corresponding to the nozzle 36 arranged on the side of the first reference mark 37 is overlapped with the recognition position 192 of the image 191. At this time, the coordinate data of each of the processing point marks 133 is previously registered on the individual control device 200, and therefore, the X, Y stage 70 is controlled based on the coordinate data. Then, the flow proceeds to step ST24 and ST25.

In step ST24, the positional deviation of the processing point mark 133 is detected. In step ST25, whether or not the positional deviation is within a position error allowable range is determined.

Figure 19:
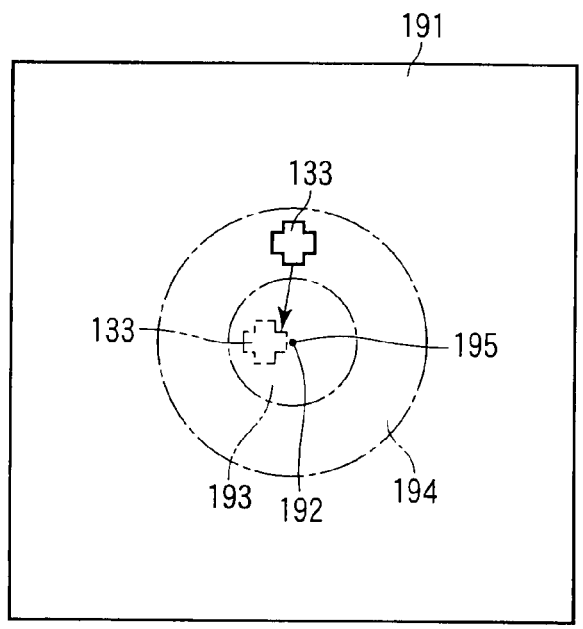
FIG. 19 is a view of an image showing a state after an X, Y stage is driven based on previously registered coordinate data of a processing point mark so that the processing point mark is disposed on a recognition position.

Specifically, when the operation of the X, Y stage 70 is terminated, the individual control device 200 detects the position of the processing point mark 133 in the image 191 taken by the camera 190. FIG. 19 shows a state after the X, Y stage 70 is driven based on the previously registered coordinate data of the processing point mark 133 so that the processing point mark 133 is disposed on the recognition position 192. In FIG. 19, the recognition position 192 is set at the center of the image 191.

As shown in FIG. 19, a position error allowable range 193 and a half pitch range 194 are set in the image 191.

In the position error allowable range 193, if the processing point mark 133 is within the position error allowable range 193, the position at which the nozzle 36 is formed, that is, the position to which the laser beam L is applied is within an allowable error range. The position error allowable range 193 is shown by a circle having a radius of a predetermined length and centering on the recognition position 192.

In the present embodiment, as an example, when the center of the processing point mark 133 is located inside the line specifying the position error allowable range 193, the processing point mark 133 is regarded to be within the position error allowable range 193. Also when the center of the processing point mark 133 is located on the line specifying the position error allowable range 193, the processing point mark 133 is regarded to be within the position error allowable range 193. The line specifying the position error allowable range 193 is shown by the two-dot chain line in FIG. 19.

As shown in FIG. 19, the half pitch range 194 has a radius of a half length of a distance between the processing point mark 133 to be disposed on the recognition position 192 and another processing point mark 133, which is one of a plurality of processing points disposed around the processing point mark 133 to be disposed on the recognition position 192 and is disposed in a position closest to the processing point mark 133 to be disposed on the recognition position 192. The half pitch range 194 is shown by a circle centering on the recognition position 192. Alternatively, the half pitch range 194 is shown by a circle having a radius of a length slightly smaller than the half length of the distance between the processing point mark 133 to be disposed on the recognition position 192 and the other processing point mark 133 disposed at the position closest to the processing point mark 133 to be disposed on the recognition position 192. The half length and the length close to the half length are regarded as a substantially half length.

The position of the other processing point mark 133 disposed in the position closest to each of the processing point marks 133 is different for each of the processing point marks 133. Therefore, the half pitch range 194 is different for each of the processing point marks 133.

In the present embodiment, as an example, when the center of the processing point mark 133 is located inside the line specifying the half pitch range 194, the processing point mark 133 is regarded to be within the half pitch range 194. Also when the center of the processing point mark 133 is located on the line specifying the half pitch range 194, the processing point mark 133 is regarded to be within the half pitch range 194. The line specifying the half pitch range 194 is shown by the two-dot chain line in FIG. 19.

In FIG. 12, the other processing point mark 133, which is disposed in the position closest to the processing point mark 133 to be disposed on the recognition position 192, is shown by the one-dot chain line. When the processing point mark 133 to be disposed on the recognition position 192 is disposed within the position error allowable range 193, the other processing point mark 133 is not disposed within the half pitch range 194. The half pitch range 194 in this embodiment includes the position error allowable range 193.

As shown in FIG. 19, when there is no processing point mark 133 within the position error allowable range 193, the individual control device 200 proceeds to step ST26. In step ST26, the processing point mark 133 disposed in the half pitch range 194 is detected, and, at the same time, the X, Y stage 70 is moved so that the processing point mark 133 is overlapped with the recognition position 192.

As described above, the half pitch range 194 is a circle having a radius of the half length between the processing point mark 133 to be disposed on the recognition position 192 and the processing point mark 133 disposed in the position closest to the processing point mark 133 to be disposed on the recognition position 192 or having a radius of a length slightly smaller than the half length, and therefore, a plurality of the processing point marks 133 do not simultaneously exit within the half pitch range 194. Since the X, Y stage 70 is controlled based on the previously set coordinate of each of the processing point marks 133, the processing point mark 133 to be disposed on the recognition position 192 is prevented from existing outside the half pitch range 194. Therefore, the processing point mark 133 to be disposed on the recognition position 192 is at least disposed within the half pitch range 194. The half pitch range 194 includes the position error allowable range 193.

FIG. 19 shows a state that the X, Y stage 70 is controlled so that the processing point mark 133 is disposed on the recognition position 192 when the processing point mark 133 exists outside the position error allowable range 193 and is disposed within the half pitch range 194. As shown in FIG. 19, the processing point mark 133 may be disposed within the position error allowable range 193 after the control of the X, Y stage 70. The processing point mark 133 whose position is corrected so that the processing point mark 133 is disposed within the position error allowable range 193 is shown by the two-dot chain line.

When the processing point mark 133 is disposed within the position error allowable range 193, the flow then proceeds to step ST27.

In step ST27, each of the individual control device 200 transmits a laser request signal to the overall control device 25.

When the laser request signal is transmitted, the overall control device 25 starts the operation. As shown in FIG. 14, in step ST31, the overall control device 25 determines whether or not the first application of the laser beam L is to be performed after transition of the processing apparatus 10 from the stop state to the operation state. When it is determined that the first application of the laser beam L should be performed, the flow proceeds to step ST32. Although the first application of the laser beam L after transition of the state of the processing apparatus 10 from the stop state to the operation state is the first time of application of the laser beam L, it does not include an operation of detecting the operation error of each of the processing units 50 shown in FIG. 13.

The overall control device 25 confirms whether or not the laser request signal from the processing unit 50 to be operated has been received in step ST32. The processing unit 50 having transmitted the laser request signal is in a state of terminating the positioning of the printer head 30.

In the present embodiment, all the processing units 50 are operated, and therefore, in step ST32, it is confirmed that the laser request signals have been transmitted from all the processing units 50. All the processing units 50 may not be operated, and, for example, three or two processing units 50 may be operated when it is sufficient that the three or two processing units 50 are provided. In this case, it is confirmed that the laser request signals are transmitted from the three or two processing units 50 to be operated.

The transition from the stop state to the operation state is for example the transition from a state that since an operation starting switch or the like is not depressed, the processing apparatus 10 is not operated to a state that the laser beam L can be applied by depression of the operation starting switch or the like. The operation in the detection of the error peculiar to the processing unit 50 is not included.

Then, the flow proceeds to step ST33. In step ST33, the overall control device 25 opens the shutter 180 of the processing unit 50 having transmitted the laser request signal. At this point, the shutters 180 of all the processing units 50 are opened. Then, the flow proceeds to step ST34.

In step ST34, the overall control device 25 controls the laser oscillator 20 to allow the laser oscillator 20 to apply the laser beam L. The laser beam L emitted from the laser oscillator 20 passes through the mirror 170 and the machining lens 160 to reach the printer head 30 of each of the processing units 50. Then the flow proceeds to step ST35.

In step ST35, the overall control device 25 monitors the laser beam L emitted from the laser oscillator 20. When the laser oscillator 20 applies the laser beam at 200 Hz, the flow proceeds to step ST36, and the overall control device 25 stops the application of the laser beam L.

Then, the flow proceeds to step ST37. The overall control device 25 closes the shutter 180 of each of the processing units 50 in step ST37.

As shown in FIG. 15, in each of the processing units 50, when the individual control device 200 confirms that the shutter 180 is closed in step ST28 after the transmission of the laser request signal, or in other words, when the shutter 180 is closed after completion of the application of the laser beam L from the laser oscillator 20, the flow proceeds to step ST29, and the individual control device 200 confirms whether or not all the nozzles 36 have been processed in step ST29.

When the individual control device 200 confirms the closing of the shutter 180, the overall control device 25 may transmit to each of the individual control devices 200 such a report that a signal for closing the shutter 180 has been transmitted. The report in this case is a signal. According to this constitution, the individual control device 200 can confirm the closing of the shutter 180.

At this point, only one nozzle 36 is processed, and therefore, the flow returns to step ST23. In step ST23, the individual control device 200 controls the X, Y stage 70 to move the position of the nozzle 36 to be next processed to the arrival point of the laser beam L.

Then, as described above, the operation from steps ST23 to ST27 are performed, and the laser request signal is transmitted to the overall control device 25.

Figure 20:
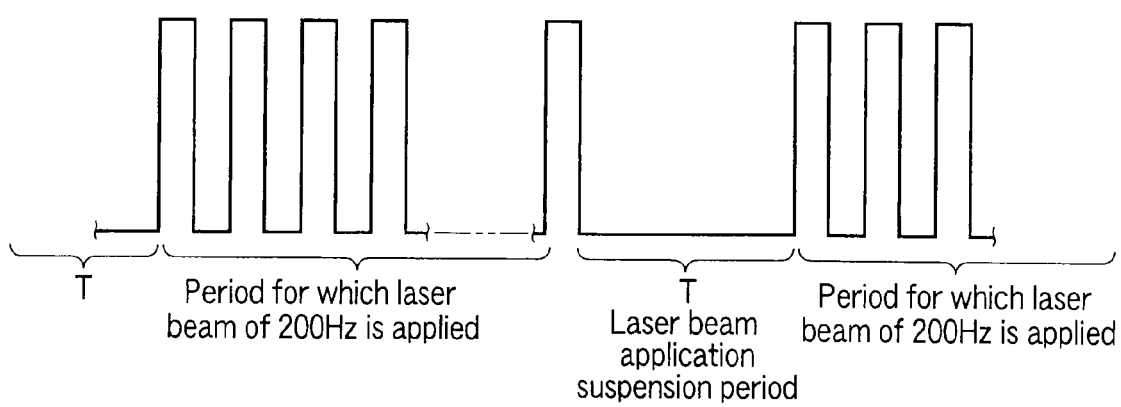
FIG. 20 is a graph showing a state of application of a laser beam from a laser oscillator shown in FIG. 1.

The overall control device 25 performs control so that the laser beam L is continuously applied from the laser oscillator 20 at an interval of a predetermined time T. FIG. 20 is a graph showing a state of the application of the laser beam L from the laser oscillator 20.

As shown in FIG. 20, the overall control device 25 performs control so that the laser beam L is applied for one second in step ST34, and thereafter, the application of the laser beam L is stopped for the predetermined time T in step ST36 and the subsequent steps. When the laser request signal is transmitted from each of the processing units 50 within the predetermined time T, the laser beam L is applied again after a lapse of the predetermined time T. To stop the laser beam application in step ST36 shows the start of the period for which the laser beam application is suspended. The suspension time is the predetermined time T.

Specifically, after the suspension of the application of the laser beam L, the flow proceeds to step ST38, and it is confirmed whether the laser request signal has been transmitted from any one of the processing units 50 within the predetermined time T.

When all the nozzles 36 are not processed in each of the polyimide films 33, if the operation from step ST23 to step ST27 is terminated, the laser request signal is transmitted from each of the processing units 50. If the request is transmitted within a period of suspension of the application of the laser beam L, the flow returns to step ST31. The laser beam application suspension period is the predetermined time T. In the second and subsequent applications of the laser beam L, the flow proceeds from step ST31 to step ST33. After a lapse of the predetermined time T, the laser beam L is applied again in step ST34. Then, the following steps are repeated.

The predetermined period T is an interval of application of the laser beam L, that is, a period for which the laser beam L is not applied. The predetermined period T seems to be a period from the termination of the operation from step ST23 to step ST27 in each of the processing units 50 to step ST34. The predetermined period T is just a standard time, and the operation from step ST23 to step ST27 is not always terminated in each of the processing units 50.

Until all the nozzles 36 are processed in each of the processing units 50, the individual control device 200 repeats the operation from step ST23 to step ST29, and, at the same time, the overall control device 25 repeats the operation from step ST33 to step ST38.

When all the nozzles 36 are processed in each of the processing units 50, the operation of the processing unit 50 is terminated. Therefore, the printer head 30 in which all the nozzles 36 are processed is exchanged with the printer head 30 with the nozzles 36 to be processed.

This point is specifically described. For example, the processing units 50 are different from each other in the time required for moving the processing point mark 133 to the recognition position 192, and therefore, for the above reason, there occurs some difference in the processing between the processing units 50.

Therefore, there may occur such a situation that all the nozzles 36 of the printer head 30 of one of the four processing units 50 are processed at some point, the nozzles 36 of the printer head 30 of the remaining three processing units 50 are being processed. In this case, only the printer head 30 of the processing unit 50 after the processing is exchanged. The nozzles 36 being processed are the remaining unprocessed nozzles 36.

In the above case, in the processing unit 50 after exchange of the printer head 30, the operation from step ST21 is started regardless of the operations of the other processing units 50 and the overall control device 25. When the operation up to step ST23 is complete, the processing unit 50 transmits the laser request signal to the overall control device 25 in step ST24.

After the first laser beam application from the start of the operation of the processing apparatus 10, the overall control device 25 allows the laser oscillator 20 to apply the laser beam L at a constant interval if there is any laser request. Here the application of the laser beam L at a constant interval means the application of the laser beam L with a time interval of the predetermined time T. Specifically, a laser beam of 200 Hz is applied, and then the laser beam of 200 Hz is applied again after the lapse of the predetermined time T.

The individual control device 200 of the processing unit 50 with the exchanged printer head 30 irregularly transmits the laser request signal to the overall control device 25, because the transmission time is changed depending on the time required for mounting the printer head 30. In other words, the individual control device 200 may transmit the laser request signal not only within the predetermined time T for which the laser oscillator 20 does not apply the laser beam L, but also while the laser oscillator 20 actually applies the laser beam L.

Therefore, the overall control device 25 opens the shutter 180 so that when the laser request signal is received outside the predetermined time T for which the laser beam L is not applied, the laser beam L reaches the polyimide film 33 immediately after the predetermined time T, for which the laser beam L is not applied, immediately after the period for which the signal has been received.

Therefore, the position of the nozzle 36 to be processed may be different depending on each of the processing units 50; however, the laser beam L simultaneously reaches the polyimide film 33 of each of the processing units 50.

Meanwhile, when the processing unit 50, in which the positioning of the printer head 30 is not terminated within the predetermined time T, transmits the laser request signal outside the predetermined time T, the overall control device 25 receives the request signal within the laser beam application suspension period. Therefore, when the overall control device 25 receives the request signal from the processing unit 50 within the laser beam application suspension period, the overall control device 25 opens the shutter 180 so that the laser beam L reaches the polyimide film 33 immediately after the predetermined time T, for which the laser beam L is not applied, immediately after the period for which the signal has been received.

Even when some of the individual control devices 200 do not transmit the laser request signal for the exchange of the printer head 30, if any one of the individual control devices 200 transmits the laser request signal, the overall control device 25 controls the laser oscillator 20 to allow the laser oscillator 20 to apply the laser beam L.

As shown in FIG. 14, when no laser request signal is transmitted in step ST38, it is determined that the processing of all the polyimide films 33 to be processed is terminated in each of the processing units 50, whereby the processing apparatus 10 stops the operation.

The processing apparatus 10 in configured to comprise a plurality of processing units 50, and consequently can simultaneously process a plurality of kinds of processed objects. This point will be specifically described.

As described above, each of the processing units 50 can independently perform holding and positioning of a processed object. The overall control device 25 controls the shutter 180 so that the laser beam L is supplied to only the processing unit 50 having transmitted the laser request.

Therefore, the processing units 50 are controlled independently from each other, and, at the same time, the overall control device 25 can arbitrarily control the supply of the laser beam L to each of the processing units 50. Consequently, different processed objects can be processed in each of the processing units 50.

As an example, when any malfunction of the processing unit 50 occurs at a specified time during the operation of the processing unit 50, the malfunction may be corrected at the next specified time.

Specifically, the individual control device 200 stores errors detected after each movement of the X, Y stage 70. When there always occurs such an error that the application position of the laser beam L is deviated in the movement of the X, Y stage 70 to specific coordinates, the individual control device 200 may correct the movement of the X, Y stage 70 so that this error does not occur in the movement of the X, Y stage 70 to the specific coordinates. As an example, an average value of the amount of the position deviation at the specific coordinates is calculated from a predetermined number of times of the positional deviation, such as three or four times, and a correction value is calculated based on the average value. In the movement to the specific coordinates, the calculated correction value is incorporated into the amount of movement. This constitution can realize suppression of the deviation of the application position of the laser beam L.

The processing apparatus 10 having the above constitution branches the laser beam L, oscillated from the laser oscillator 20, with the mirror 170 to distribute the branched laser beam L to each of the processing units 50. Therefore, since a plurality of the printer heads 30 as the processed objects can be simultaneously processed, the productivity of the processing apparatus 10 is enhanced.

The overall control device 25 controls the operation of the shutter 180, whereby the laser beam L can be supplied to only the processing unit 50 requiring the application of the laser beam L. Thus, when there is the processing unit 50 in which the printer head 30 is being exchanged, or when there is the processing unit 50 in which the printer head 30 cannot be positioned within a designated time, the laser beam L is supplied to the processing units 50 other than the relevant one, whereby the entire operation of the processing apparatus 10 is not stopped, and therefore, the operation rate is not reduced.

The number of the processing units 50 can be increased or decreased only by adjusting the mirror 170. Therefore, the productivity of the processing apparatus 10 can be enhanced by small changes such as changing the mirror 170 of each of the processing units 50.

Further, the processing apparatus 10 comprises a plurality of the processing units 50, and, at the same time, the processing units 50 can be processed independently from each other; therefore, a plurality of kinds of processed objects can be simultaneously processed. Namely, the flexibility of processing in the processing apparatus 10 can be enhanced.

According to the above constitution, the processing apparatus 10 of the present invention can realize the enhancement of the productivity and the flexibility of processing.

Since the optical system 300 comprises the mirror 170, the laser beam L can be guided to the processing unit 50 with a relatively simple structure.

Each of the mirrors 170 is adjusted so that the intensities of the laser beams reaching the respective processing units 50 are the same. This constitution can realize the simultaneous processing of the same kind of processed objects, and thus, the productivity can be enhanced.

In the X and Y axis coordinate measuring instruments 141 and 142, the linear scales 144 and 151 and the index scales 145 and 152 are disposed on the extension surface V2 of the surface 110a of the processing stage 110, and the linear scales 144 and 151, the index scales 145 and 152, and the printer head 30 are located at the same position in the Z axis direction Z, that is, they have the same heights in the Z axis direction Z.

Therefore, in the alignment of the position in the printer head 30 on which the nozzle 36 should be processed with the application position of the laser beam L, the deviation can be kept small. This point will be specifically described.

When the processing stage 110 moves, that is, moves in the X axis direction X and the Y axis direction Y, pitching in each of the X and Y axis directions X and Y caused by, for example, the acceleration and deceleration in accordance with the movement of the processing stage 110 affects the printer head 30 and the X and Y axis coordinate measuring instruments 141 and 142. Consequently, the pitching causes slight displacement or deformation of the X, Y stage 70, the processing stage 110, and so on; therefore, the position of the printer head 30 may be slightly deviated, and the positions of the X and Y axis coordinate measuring instruments 141 and 142 may be slightly deviated.

Regarding the deviation caused by the pitching, the deviation caused by the pitching in the X axis direction X increases in proportion to a distance from the nut 75b of the ball screw 75 driving the X axis stage 73. Likewise, the deviation caused by the pitching in the Y axis direction Y increases in proportion to a distance from the nut 87b of the ball screw 87 moving the Y axis stage 82.

When the distances from the nuts 75b and 87b to the X and Y axis coordinate measuring instruments 141 and 142 are different from those from the nuts 75b and 87b to the printer head 30, the deviation amounts acting on the X and Y axis coordinate measuring instruments 141 and 142 and the printer head 30 are different, and therefore, the relative positional relationship between the X axis coordinate measuring instrument 142 and the printer head 30 and the relative positional relationship between the Y axis coordinate measuring instrument 141 and the printer head 30 may change between the stationary state and the moving state of the processing stage 110.

Therefore, it tends to be difficult to accurately move the printer head 30 to the application position of the laser beam L based on the detection result from the X and Y axis coordinate measuring instruments 141 and 142.

However, in the present embodiment, the light-emitting elements 146a and 153a and the light-receiving elements 148a and 154a of the Y axis coordinate measuring instrument 141 and the X axis coordinate measuring instrument 142 are disposed as above, whereby the X and Y axis coordinate measuring instruments 141 and 142 are disposed near the printer head 30.

Therefore, the influence of the pitching acting on the surface 33a of the printer head 30, that is, the surface to which the laser beam L is applied and the influence of the pitching acting on the light-emitting elements 146a and 153a and the light-receiving elements 148a and 154a are substantially the same.

Namely, the relative positional relationship between the printer head 30 and the X and Y axis coordinate measuring instruments 141 and 142 does not change between the stationary state and the moving state of the processing stage 110. Even if the relative positional relationship may change, the change is very small.

Consequently, even during the movement of the processing stage 110, the position in the printer head 30 on which the nozzle 36 should be formed can be accurately moved to the application position of the laser beam L based on the detection result from the X and Y axis coordinate measuring instruments 141 and 142.

The values of the natural frequencies of the supporting parts 146, 148, 153, and 154 are different from the value of the natural frequency of the entire holding part 60 and the value of the natural frequency of the floor 5. Therefore, since the supporting parts 146, 148, 153, and 154 do not resonate with the oscillation input from the floor 5 and the oscillation of the entire holding part 60 during the operation of the processing apparatus 10, the measurement result from the X and Y axis coordinate measuring instruments 141 and 142 is not affected by the resonance. Consequently, the accuracy of the measurement results from the X and Y axis coordinate measuring instruments 141 and 142 is prevented from being reduced.

The processing apparatus 10 comprises the reference gauge 130 and the camera 190, whereby the position in the printer head 30 on which the nozzle 36 should be formed can be precisely positioned to the application position of the laser beam L.

The position detecting part 140 may not be provided in the processing apparatus 10, and may be provided in a processing apparatus for processing a processed object not with a laser beam, but with other mechanisms such as a drill. Also in such a case, the position detecting part 140 can precisely position the printer head 30 which is a processed object.

Likewise, the positioning mechanism comprising the reference gauge 130 and the camera 190 may not be provided in the processing apparatus 10. For example, the positioning mechanism may be provided in a processing apparatus for processing a processed object not with a laser beam, but with other mechanisms such as a drill. Also in such a case, the printer head 30 as a processed object can be precisely positioned by the reference gauge 130 and the camera 190.

In the present invention, the X and Y axis coordinate measuring instruments 141 and 142 are disposed on the extension surface of the surface 110a of the processing stage 110, and the X and Y axis coordinate measuring instruments 141 and 142 and the printer head 30 are disposed at the same position in the Z axis direction Z.

However, the X and Y axis coordinate measuring instruments 141 and 142 may be disposed at least one of the above two positions, and consequently the similar effect can be obtained.

For example, even when the X and Y axis coordinate measuring instruments 141 and 142 are disposed only on the extension surface of the surface 110a of the processing stage 110, the similar effect can be obtained. Alternatively, even when the X and Y axis coordinate measuring instruments 141 and 142 are disposed at the same position in the Z axis direction Z, the similar effect can be obtained.

In the present embodiment, the X and Y axis coordinate measuring instruments 141 and 142 are disposed on the extension surface V2 of the surface 110a of the processing stage 110; however, even when they are disposed on the surface 110a of the processing stage 110, the similar effect can be obtained. For example, the index scales 145 and 152 of the X and Y axis coordinate measuring instruments 141 and 142 may be disposed. In such a case, the index scales 145 and 152 include respectively the light-receiving elements 148a and 154a.

However, the Y axis coordinate measuring instrument 141 and the X axis coordinate measuring instrument 142 are simultaneously disposed at the above two positions, and consequently a higher positioning accuracy can be obtained.

In the present embodiment, the holding part 60 can move in the three directions that are a plurality of the moving directions of the present invention, that is, the X, Y, and Z axis directions X, Y, and Z of the present embodiment, and the X axis coordinate measuring instrument 142 and the Y axis coordinate measuring instrument 141 are used as an example of a position measuring instrument. Namely, the position measuring instruments are provided in two directions of the three directions, that is, the X and Y axis directions X and Y of the present embodiment.

However, the present invention is not limited to the above example. The position measuring instrument of the present invention may be provided so that the position in the Z axis direction Z is measured.

Alternatively, the position measuring instrument of the present invention may be applied only to the measuring instrument for measuring the position in the X axis direction X. In this case, the position measuring instrument of the present invention is the X axis coordinate measuring instrument 142 used in the present embodiment. Likewise, the position measuring instrument of the present invention may be applied only to the measuring instrument for measuring the position in the Y axis direction Y. In this case, the position measuring instrument of the present invention is the Y axis coordinate measuring instrument 141 used in the present embodiment. Likewise, the position measuring instrument of the present invention may be applied only to the position measuring instrument for measuring the position in the Z axis direction Z.

As described above, the position measuring instrument may be provided in at least one direction of the moving directions of a processed object.

The individual control device sets the position error allowable range 193, and when there is no processing point mark within the position error allowable range 193, the X, Y stage 70 is controlled for correction. This constitution can realize highly accurate formation of the nozzle 36.

In the movement of the X, Y stage 70, the positional deviation at a specific position where the movement error easily occurs is stored, and, at the same time, the average value of a predetermined number of times of the positional deviation is calculated, and the correction value is calculated based on the average value. The correction value is incorporated in the next and subsequent movement to the specific position. According to this constitution, even at a position where the positional deviation easily occurs, the correction value is incorporated, whereby the amount of the positional deviation can be kept small.

In the present embodiment, the X and Y axis coordinate measuring instruments 141 and 142 which are examples of the position measuring instruments are adopted in the processing apparatus 10; however, it is not limited thereto. For example, even in a processing apparatus for processing a processed object not with a laser beam, but with other processing unit such as a drill, when the processing apparatus comprises a holding part for movably holding a processed object, the positioning accuracy of the processed object can be enhanced by using the position measuring instrument of the present invention.

In the above case, the position measuring instrument is used in the processing apparatus shown in the following additional statements 1 to 4, and consequently the similar effect can be obtained.

1. A processing apparatus comprising:
a holding part which comprises a processing stage, onto which a processed object is fixed, and movably holds the processed object; and
a position measuring instrument which measures a position of the processing stage,
wherein the position measuring instrument is fixed to a portion in the holding part, which moves along with the processing stage, and disposed on the processing stage or on an extension surface of the processing stage.

2. The processing apparatus according to the additional statement 1, wherein the holding part is configured to move the processed object in a plurality of directions perpendicular to each other, and
the position measuring instrument is configured to detect a position along one direction, and at least one or more position measuring instruments are provided so that positions along at least one or more of said plurality of directions are detected.

3. The processing apparatus according to the additional statement 1, wherein the position measuring instrument is fixed to the holding part through a supporting part, and a value of a natural frequency of the supporting part is different from a value of a natural frequency of a portion on which the holding part is placed and a value of a natural frequency of the holding part.

4. A processing apparatus comprising:
a holding part which movably holds a processed object; and
a position measuring instrument which measures a position of the holding part,
wherein the holding part comprises a processing stage, which can move along a first direction and a second direction perpendicular to each other and places thereon the processed object,
the processing unit comprises a first position measuring instrument which measures a position in the first direction of the holding part and a second position measuring instrument which measures a position in the second direction of the holding part,
the first position measuring instrument is supported by a portion in the holding part, which can move in the first direction, and disposed at the same height as the processed object in a third direction at right angles to the first and second directions, and
the second position measuring instrument is supported by a portion in the holding part, which can move in the second direction, and disposed at the same height as the processed object in the third direction.

5. The processing apparatus according to the additional statement 4, wherein the first position measuring instrument is fixed by the holding part through a first supporting part,
the second position measuring instrument is fixed by the holding part through a second supporting part, and
a natural frequency of the first and second holding parts has a different value from a natural frequency of the portion on which the holding part is placed and a natural frequency of the holding part.

The holding part 60 described in connection with the present embodiment is an example of the holding part of the additional statements 1 to 5. The X axis coordinate measuring instrument 142 and the Y axis coordinate measuring instrument 141 described in connection with the present embodiment are examples of the position measuring instrument of the additional statements. The supporting parts 146, 148, 153, and 154 described in connection with the present embodiment are examples of the holding part of the additional statements. The X axis direction X described in connection with the present embodiment is an example of the first direction of the additional statements. The Y axis direction Y described in connection with the present embodiment is an example of the second direction of the additional statements. The Z axis direction Z described in connection with the present embodiment is an example of the third direction of the additional statements. The Y axis coordinate measuring instrument 141 described in connection with the present embodiment is an example of the first position measuring instrument. The X axis coordinate measuring instrument 142 described in connection with the present embodiment is an example of the second position measuring instrument.

In the present embodiment, the reference gauge 130 and the camera 190 as the examples of the reference gauge and the camera of the present invention are used in the processing apparatus 10; however, they are not limited thereto. For example, even in a processing apparatus for processing a processed object not with a laser beam, but with other processing unit such as a drill, when the processing apparatus comprises the holding part movably holding the processed object, the positioning accuracy of the processed object can be enhanced by using the reference gauge and the camera of the present invention.

In the above case, the reference gauge and the camera are used in the processing apparatus shown in the following additional statements 6 to 8, whereby the similar effect can be obtained.

6. A processing apparatus comprising:
a holding part which movably holds a processed object;
a reference gauge comprising a processing point mark;
a photographing part which photographs the reference gauge; and
a processing means which processes the processed object,
wherein a relative positional relationship in the plan view, as viewed from a photographing position of the photographing part, between a recognition position set within a photographing range of the photographing part and the processing point mark is the same as a relative positional relationship in the plan view, as viewed from a direction in which the processing means advances toward the processed object, between a working point, which is set in the processed object and at which the processing means should reach, and a position at which the processing part reaches.

The processing means in the additional statement 6 is, for example, the laser beam L used in the present embodiment. The direction in which the processing means advances toward the processed object is the application direction of the laser beam L. However, the processing means is not limited to the laser beam L. For example, when the processed object is processed with a drill, the processing means is the drill. In this case, the direction in which the processing means advances toward the processed object is a direction in which the drill approaches the processed object.

7. The processing apparatus according to the additional statement 6, further comprising:
a control part which controls the movement of the holding part,
wherein an image taken by the photographing part is transmitted to the control part, and
when the processing point mark in the image, taken by the photographing part, deviates from the recognition position, the control part detects the positional deviation after each movement of the holding part, and when the positional deviation exceeds an error range, the control part controls the holding part so that the processing point mark is disposed within the error range.

The control part in the additional statement 7 is, for example, the individual control device 200 described in the present embodiment.

8. The processing apparatus according to the additional statement 7, wherein the control part stores the deviation from the recognition position detected after each movement of the holding part and incorporates a correction value into a moving amount in the movement of the holding part to the same position, the correction value being an average amount of a predetermined number of times of the positional deviation detected in the movement of the holding part to the same position.

The invention according to the additional statements 1 to 8 can solve the following conventional problems.

Conventionally, a processing apparatus for processing a processed object with processing means such as a laser beam comprises a movable processing stage so that a laser beam is applied to a plurality of processing points of the processed object. The movement of the processing stage changes the position of the laser beam applied to the processed object. For example, the processing stage is fixed onto an X, Y stage which can move in two directions perpendicular to each other, whereby the processing stage can be moved.

This type of processing apparatus has a position detection part which detects a position of the processing stage so that the laser beam is accurately applied to the processed object. For example, a linear encoder is used as the position detection part.

For example, the linear encoders are provided respectively near a ball screw allowing the X, Y stage to move in an X axis direction and near a ball screw allowing the X, Y stage to move in a Y axis direction. The linear encoders respectively detect the position in the X axis direction and the position in the Y axis direction, whereby the position coordinate of the processing stage is detected.

However, the processed object is affected by acceleration and deceleration caused by the movement in the X and Y axis directions and pitching. Therefore, the relative positional relationship between the encoder and the processed object changes between the stationary state and the moving state of the processing stage.

This point will be specifically described. The encoder is disposed near the ball screw, whereby influences on the encoder caused by the acceleration and deceleration of the movement of the X, Y stage and pitching are reduced. However, influences on the processed object fixed onto the processing stage disposed at a position away from the ball screw are increased.

Thus, the relative position of the processed object with respect to the encoder when the processing stage is in the moving state deviates with respect to the relative positional relationship between the encoder and the processed object when the processing stage is in the stationary state. Consequently, when the processing stage is moving, it is difficult to precisely align the position of the processing point of the processed object with the application position of the laser beam based on the position coordinate detected by the encoder. Therefore, the processing accuracy may be reduced.

The invention according to the additional statements 1 to 8 can enhance the processing accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing apparatus comprising:
a laser oscillator configured to oscillate a laser beam;
an overall control device configured to control an operation of the laser oscillator; and
a plurality of processing units each comprising a holding part configured to hold a processed object, an optical system configured to guide the laser beam, oscillated from the laser oscillator, toward the processed object, a shutter configured to selectively prevent the laser beam from reaching the processed object, and an individual control device configured to control an operation of the holding part, and configured to transmit a laser request signal to the overall control device,
wherein the overall control device determines laser beam application suspension periods in which the laser oscillator does not irradiate the laser beam at certain intervals to perform a first control, a second control, and a third control, wherein, in the first control, when the overall control device receives the laser request signal from all of the individual control devices of the processing units during a total period of the laser beam application suspension periods and laser beam application periods occurring before the beam application suspension periods, the overall control device controls all of the shutters of the plurality of processing units to enable the laser beam to reach the processing object and drives the laser oscillator to oscillate the laser beam after each end of the laser beam application suspension periods;

wherein, in the second control, when the overall control device receives the laser request signal from at least one of the individual control devices of the processing units during a total period of the laser beam application suspension periods and laser beam application periods occurring before the beam application suspension periods, the overall control device controls the shutters of the processing units comprising the at least one individual control device which has transmitted the laser request signal to enable the laser beam to reach the processing object, controls the shutters of the processing units comprising the individual control device which has not transmitted the laser request signal to hold the laser beam from reaching the processing object, and drives the laser oscillator to oscillate the laser beam after each end of the laser beam application suspension periods; and wherein, in the third control, when the overall control device does not receive any laser request signal from the individual control device of the processing units during a total period of the laser beam application suspension periods and laser beam application periods occurring before the beam application suspension periods, the overall control device terminates the control of the laser oscillator.

2. The processing apparatus according to claim 1, wherein the optical system comprises a mirror configured to reflect the laser beam, oscillated from the laser oscillator, toward the processed object, the mirrors of the processing units are arranged with a fixed distance in an advancing direction of the laser beam, and the mirrors from the mirror, at which the laser beam first reaches in the advancing direction of the laser beam, to the mirror disposed next to the last one have characteristics reflecting a portion of the laser beam and allowing the remaining laser beam to transmit therethrough, and the mirror at which the laser beam last reaches in the advancing direction of the laser beam reflects all the laser beams having reached the mirror.

3. The processing apparatus according to claim 2, wherein the mirror of said each processing unit is adjusted so that intensities of the laser beams reaching the processed objects are the same.

4. The processing apparatus according to claim 1, wherein the holding part comprises a processing stage onto which the processed object is fixed, the processing unit comprises a position measuring instrument configured to measure a position of the processing stage, and the position measuring instrument is fixed to a portion in the holding part, configured to move along with the processing stage, and disposed on the processing stage or on an extension surface of the processing stage.

5. The processing apparatus according to claim 4, wherein the holding part is configured to move the processed object in a plurality of directions perpendicular to each other, and the position measuring instrument is configured to detect a position along one direction, and at least one or more position measuring instruments are provided so that positions along at least one or more of said plurality of directions are detected.

6. The processing apparatus according to claim 4, wherein the position measuring instrument is fixed to the holding part through a supporting part, and a value of a natural frequency of the supporting part is different from a value of a natural frequency of a portion on which the holding part is placed and a value of a natural frequency of the holding part.

7. The processing apparatus according to claim 1, wherein the holding part comprises a processing stage configured to be movable along a first direction and a second direction perpendicular to each other and onto which the processed object is fixed, the processing unit comprises a first position measuring instrument configured to measure a position in the first direction of the processing stage and a second position measuring instrument configured to measure a position in the second direction of the processing stage, the first position measuring instrument is supported by a portion in the holding part configured to be movable in the first direction, and is disposed at the same position as the processed object in a third direction at right angles to the first and second directions, and the second position measuring instrument is supported by a portion of the holding part configured to be movable in the second direction, and is disposed at the same position as the processed object in the third direction.

8. The processing apparatus according to claim 7, wherein the first position measuring instrument is fixed by the holding part through a first supporting part, the second position measuring instrument is fixed by the holding part through a second supporting part, and a natural frequency of the first and second holding parts has a different value from a natural frequency of the portion on which the holding part is placed and a natural frequency of the holding part.

9. The processing apparatus according to claim 1, wherein the processing unit comprises a reference gauge with a processing point mark and a photographing part configured to photograph the reference gauge, and a relative positional relationship in a plan view, as viewed from a photographing direction of the photographing part, between a recognition position, set within a photographing range of the photographing part, and the processing point mark is the same as a relative positional relationship in the plan view, as viewed from an application direction of the laser beam, between a working point which is set in the processed object and at which the laser beam should reach and a position at which the laser beam reaches.

10. The processing apparatus according to claim 9, wherein an image taken by the photographing part is transmitted to the individual control device, and when the processing point mark in an image taken by the photographing part is deviated from the recognition position, the individual control device detects the positional deviation after every movement of the holding part, and when the positional deviation exceeds an allowable error range, the individual control device controls the holding part so that the processing point mark is disposed within the allowable error range.

11. The processing apparatus according to claim 10, wherein the individual control device stores the deviation from the recognition position detected after every movement of the holding part, and previously incorporates a correction value into a moving amount in the movement of the holding part to the same position, the correction value being an average amount of a predetermined number of times of the positional deviation detected in the movement of the holding part to the same position.

* * * * *